(12) United States Patent
Haugland

(10) Patent No.: US 7,171,310 B2
(45) Date of Patent: Jan. 30, 2007

(54) METHOD OF ESTIMATING ELECTRICAL PARAMETERS OF AN EARTH FORMATION WITH A SIMPLIFIED MEASUREMENT DEVICE MODEL

(75) Inventor: Samuel Mark Haugland, Houston, TX (US)

(73) Assignee: PathFinder Energy Services, Inc., Houston, TX (US)

(*) Notice: Subject to any disclaimer, the term of this patent is extended or adjusted under 35 U.S.C. 154(b) by 564 days.

(21) Appl. No.: 10/673,843

(22) Filed: Sep. 29, 2003

(65) Prior Publication Data

US 2004/0073371 A1   Apr. 15, 2004

Related U.S. Application Data

(63) Continuation of application No. 10/086,043, filed on Feb. 28, 2002, and a continuation-in-part of application No. 09/877,383, filed on Jun. 8, 2001, now Pat. No. 6,631,328, which is a continuation-in-part of application No. 09/608,205, filed on Jun. 30, 2000, now Pat. No. 6,366,858.

(51) Int. Cl.
*G01V 3/18* (2006.01)
*G06F 19/00* (2006.01)

(52) U.S. Cl. ............... 702/7; 703/10; 324/339
(58) Field of Classification Search ......... 702/1–9; 324/334
See application file for complete search history.

(56) References Cited

U.S. PATENT DOCUMENTS

| | | | |
|---|---|---|---|
| 3,944,910 A | 3/1976 | Rau | |
| 4,185,238 A | 1/1980 | Huchital et al. | |
| 4,209,247 A | 6/1980 | Urano et al. | |
| 4,209,747 A | 6/1980 | Huchital | |
| 4,780,679 A | 10/1988 | Kenyon et al. | |
| 4,899,112 A | 2/1990 | Clark et al. | |
| 4,968,940 A * | 11/1990 | Clark et al. | .......... 324/338 |
| 5,157,605 A | 10/1992 | Chandler et al. | |
| 5,210,691 A | 5/1993 | Freedman et al. | |
| 5,469,062 A | 11/1995 | Meyer, Jr. | |
| 5,574,374 A | 11/1996 | Thompson et al. | |
| 5,594,343 A | 1/1997 | Clark et al. | |
| 5,675,147 A | 10/1997 | Ekstrom et al. | |
| 5,867,806 A | 2/1999 | Strickland et al. | |
| 5,869,968 A | 2/1999 | Brooks et al. | |
| 5,881,973 A | 3/1999 | Agajanian et al. | |
| 5,892,361 A * | 4/1999 | Meyer et al. | .......... 324/338 |
| 5,963,036 A | 10/1999 | Wu et al. | |
| 5,966,013 A | 10/1999 | Hagiwara | |

(Continued)

OTHER PUBLICATIONS

Dielectric-Independent 2-MHz Propogation Resistivities, Peter T. Wu, John R. Lovell, Brian Clark, Stephen D. Bonner and Jacques R. Tabanou, Society of Petroleum Engineers, Inc. SPE 56448, 19 pages (1999).

(Continued)

*Primary Examiner*—John Barlow
*Assistant Examiner*—Victor J. Taylor

(57) ABSTRACT

Briefly, a method of estimating electrical parameters of an earth formation employs a simplified model of a measurement tool or device in transforming or normalizing data measured by the measurement tool. Electrical parameters of the earth formation, such as conductivity or dielectric constant, for example, may be estimated based on the normalized data.

45 Claims, 13 Drawing Sheets

U.S. PATENT DOCUMENTS

| | | | |
|---|---|---|---|
| 6,047,240 | A | 4/2000 | Barber et al. |
| 6,060,884 | A | 5/2000 | Meyer, Jr. et al. |
| 6,092,024 | A | 7/2000 | Wu |
| 6,211,678 | B1 | 4/2001 | Hagiwara |
| 6,216,090 | B1 | 4/2001 | Hagiwara |
| 6,218,841 | B1 | 4/2001 | Wu |
| 6,344,746 | B1 | 2/2002 | Chunduru et al. |
| 6,366,858 | B1 | 4/2002 | Haugland |
| 6,385,545 | B1 | 5/2002 | Wu |
| 2003/0163258 | A1 | 8/2003 | Haugland |

OTHER PUBLICATIONS

New Developments in 2- MHz Electromagnetic Wave Resistivity Measurements, S. Gianzero, G. A. Merchant, M. Haugland and R. Strickland, SPWLA 35th Annual Logging Symposium, pp. 1-25 (Jun. 19-22, 1994).

Vertical Deconvolution of 2 MHz Propagation Tools, Richard Rosthal, David Allen and Stephen Bonner, SPWLA 34th Annual Logging Symposium (Jun. 13-16, 1993).

*Geometric Factor and Adaptive Deconvolution of MWD-PWR Tools*, Q. Zhou, D. J. Hilliker and D. Norwood, The Log Anayst, pp. 390-398 (Jul.-Aug. 1992).

*Reconciling Differences in Depth of Investigation Between 2- MHz Phase Shift and Attenuation Resistivity Measurements*, Tarek Habashy and Barbara Anderson, SPWLA 32nd Annual Logging Symposium, pp. 1-20 (Jun. 16-19, 1991.

*Complex Variables and Applications 5th Ed.*, Ruel V. Churchill and James Ware Brown, 2 cover pages and pp. 48-50 (1990).

*Waves and Fields in Inhomogeneous Media, Transients*, Weng Cho Chew, 2 cover pages, pp. 244-246, 360-365 and 485-487 (1990).

*Algorithm 624: Triangulation and Interpolation at Arbitrarily Distributed Points In The Plane*, Robert J. Renka, ACM Transaction on Mathematical Software, vol. 10, pp. 440-442 (Dec. 4, 1984).

*A Triangle-Based $C_1$ Interpolation Method*, R. J. Renka and A. K. Cline, rocky Mountain Journal of Mathematics, vol. 14, No. 1, pp. 223-237 (Winter 1984).

*Geophysics, A Journal of General and Applied Geophysics*, Published by The Society of Exploration Geophysicists, vol. XXVII, No. 6, Part 1, cover page and pp. 828-858 (Dec. 1962).

Moran, J. H. and Chemali, R. E., *More on the Laterolog Device*, Geophysical Prospecting 27, pp. 902-930 (1979).

*Effect of Tool Eccentricity on Some Electrical Well-Logging Tools*, John R. Lovell and Weng Cho Chew, IEEE Transactions on Geoscience and Remote Sensing, vol. 28, No. 1, pp. 127-136 (Jan. 1990).

*Fundamental Analysis of Remote-Field Eddy-Current Effect*, IEEE Transactions on Magnetics, vol. 32, No. 4, pp. 3195-3211 (Jul. 1996).

*Numerical Recipes, The Art of Scientific Computing*, © Cambridge Press 1986 and ©Numerical Recipes Software, 2 cover pages, pp. 52-65 and 520-527 (1986).

*NAG Fortran Library Manual Mark 18*, © The Numerical Algorithms Group Limited, vol. 4, D04-4E04L cover pages and pp. E04.1—E04.16 and 1-6 (Sep. 1997).

*New Discovery with Important Implications of LWD Propagation Resistivity Processing and Interpretation*, S. Mark Haugland, SPWLA 42nd Annual Logging Symposium, pp. 1-14 (Jun. 17-20, 2001).

*Handbook of Electromagnetic Materials, Monolithic and Composite Versions and Their Applications*, Perambur S. Neelakanta, PhD., C.Eng., © 1995 by CRC Press, Inc., cover pages and p. 46.

*Estimation Of Water Content and Porosity Using Combined Radar and Geoelectrical Measurements*, Grit Dannowski and Ugur Yaramanci, Technical University of Berlin, Dept. of Applied Geophysics, Jul. 28, 1999.

*Comparisions of Wireline and LWD Resistivity Highlight Resisitivity Frequency Dispersion in Sedimentary Formations*, Roland Chemali, Dale Heysee, G. A. Merchang, Charles Jackson, SPWLA 36th Annual Logging Symposium, pp. 1-12 (Jun. 26-29, 1995).

*In-situ Measurement of Resistivity Dispersions (or lack of it) Using MWD Propagation Resistivity Tools*, W. Hal Meter, SPWLA 40th Annual Logging Symposium, pp. 1-14, (May 30-Jun. 3, 1999).

Badea, Eugene A. and Everett, Mark E., *3-D Finite Element Analysis of Induction Logging*, SEG Expanded Abstract, 69th Annual Meeting, Houston, Texas, Oct. 31-Nov. 5, 1999, 4 pages.

\* cited by examiner

| Background sig0 | Medium eps0 | Deep Measurement I [s'] | I [s"] | Medium Measurement I [s'] | I [s"] |
|---|---|---|---|---|---|
| 5.000 | 10.0 | -0.159 | 0.160 | -0.155 | 0.163 |
| 2.000 | 10.0 | -0.249 | 0.255 | -0.235 | 0.261 |
| 1.000 | 10.0 | -0.346 | 0.363 | -0.313 | 0.373 |
| 0.500 | 10.0 | -0.476 | 0.519 | -0.400 | 0.528 |
| 0.200 | 10.0 | -0.701 | 0.833 | -0.506 | 0.810 |
| 0.100 | 10.0 | -0.897 | 1.18 | -0.555 | 1.07 |
| 0.050 | 10.0 | -1.09 | 1.64 | -0.564 | 1.35 |
| 0.020 | 10.0 | -1.27 | 2.39 | -0.518 | 1.70 |
| 0.010 | 10.0 | -1.32 | 3.01 | -0.458 | 1.92 |
| 0.005 | 10.0 | -1.32 | 3.61 | -0.397 | 2.10 |
| 5.000 | 50.0 | -0.159 | 0.160 | -0.155 | 0.162 |
| 2.000 | 50.0 | -0.249 | 0.255 | -0.235 | 0.261 |
| 1.000 | 50.0 | -0.347 | 0.363 | -0.314 | 0.372 |
| 0.500 | 50.0 | -0.479 | 0.517 | -0.402 | 0.527 |
| 0.200 | 50.0 | -0.710 | 0.826 | -0.513 | 0.807 |
| 0.100 | 50.0 | -0.923 | 1.17 | -0.573 | 1.07 |
| 0.050 | 50.0 | -1.15 | 1.61 | -0.600 | 1.35 |
| 0.020 | 50.0 | -1.46 | 2.33 | -0.598 | 1.71 |
| 0.010 | 50.0 | -1.17 | 2.91 | -0.593 | 1.94 |
| 0.005 | 50.0 | -1.98 | 3.41 | -0.605 | 2.12 |
| 5.000 | 100.0 | -0.159 | 0.160 | -0.155 | 0.162 |
| 2.000 | 100.0 | -0.249 | 0.255 | -0.235 | 0.260 |
| 1.000 | 100.0 | -0.348 | 0.362 | -0.315 | 0.371 |
| 0.500 | 100.0 | -0.482 | 0.515 | -0.405 | 0.526 |
| 0.200 | 100.0 | -0.721 | 0.818 | -0.523 | 0.804 |
| 0.100 | 100.0 | -0.953 | 1.15 | -0.595 | 1.06 |
| 0.050 | 100.0 | -1.23 | 1.57 | -0.645 | 1.34 |
| 0.020 | 100.0 | -1.68 | 2.21 | -0.699 | 1.70 |
| 0.010 | 100.0 | -2.07 | 2.63 | -0.751 | 1.91 |
| 0.005 | 100.0 | -2.45 | 2.89 | -0.808 | 2.05 |

FIG. 7

| 1/sigma | eps_rel | db_pt | db_man | deg_pt | deg_man |
|---|---|---|---|---|---|
| 0.1 | 35 | 16.39681 | 16.34921 | 127.5789 | 126.7759 |
| 0.16 | 35 | 12.36776 | 12.35717 | 100.1192 | 99.43253 |
| 0.26 | 35 | 9.218385 | 9.238105 | 78.29757 | 77.74387 |
| 0.41 | 35 | 6.771087 | 6.813523 | 60.93389 | 60.52257 |
| 0.66 | 35 | 4.885574 | 4.94271 | 47.10585 | 46.83735 |
| 1.05 | 35 | 3.450289 | 3.51429 | 36.09731 | 35.96213 |
| 1.68 | 35 | 2.375379 | 2.439275 | 27.35548 | 27.33459 |
| 2.69 | 35 | 1.587098 | 1.645417 | 20.45383 | 20.52076 |
| 4.31 | 35 | 1.023677 | 1.072881 | 15.05909 | 15.18367 |
| 6.9 | 35 | 0.632716 | 0.671291 | 10.90276 | 11.05577 |
| 11.04 | 35 | 0.369951 | 0.398108 | 7.759132 | 7.91643 |
| 17.67 | 35 | 0.198911 | 0.218012 | 5.431487 | 5.576438 |
| 28.28 | 35 | 9.08E-02 | 0.10272 | 3.746272 | 3.870013 |
| 45.27 | 35 | 2.41E-02 | 3.07E-02 | 2.552769 | 2.652737 |
| 72.47 | 35 | -1.65E-02 | -1.36E-02 | 1.72462 | 1.802352 |
| 115.99 | 35 | -4.11E-02 | -4.07E-02 | 1.160437 | 1.219516 |
| 185.66 | 35 | -5.60E-02 | -5.74E-02 | 0.782376 | 0.826956 |
| 297.18 | 35 | -6.53E-02 | -6.78E-02 | 0.532895 | 0.566854 |
| 475.68 | 35 | -7.12E-02 | -7.44E-02 | 0.37062 | 0.397166 |
| 761.4 | 35 | -7.50E-02 | -7.86E-02 | 0.266387 | 0.287952 |
| 1218.73 | 35 | -7.73E-02 | -8.13E-02 | 0.200079 | 0.218386 |
| 1950.76 | 35 | -7.89E-02 | -8.30E-02 | 0.158176 | 0.174389 |
| 3122.48 | 35 | -7.98E-02 | -8.41E-02 | 0.131809 | 0.14669 |
| 4997.98 | 35 | -8.04E-02 | -8.48E-02 | 0.115262 | 0.129303 |
| 8000 | 35 | -8.08E-02 | -8.52E-02 | 0.104896 | 0.118408 |

FIG. 10

| 1/sigma | eps_rel | db_pt | db_man | deg_pt | deg_man |
|---|---|---|---|---|---|
| 500 | 10 | -1.64E-02 | -1.69E-02 | 0.286526 | 0.303246 |
| 500 | 12.47 | -2.18E-02 | -2.26E-02 | 0.292002 | 0.309431 |
| 500 | 15.55 | -2.86E-02 | -2.98E-02 | 0.299324 | 0.317704 |
| 500 | 19.39 | -3.71E-02 | -3.87E-02 | 0.309207 | 0.328873 |
| 500 | 24.18 | -4.78E-02 | -4.99E-02 | 0.322653 | 0.344071 |
| 500 | 30.16 | -6.10E-02 | -6.37E-02 | 0.341062 | 0.364877 |
| 500 | 37.61 | -7.75E-02 | -8.10E-02 | 0.36638 | 0.393481 |
| 500 | 46.9 | -9.79E-02 | -0.1023 | 0.40128 | 0.43288 |
| 500 | 58.48 | -0.12309 | -0.12865 | 0.449408 | 0.487148 |
| 500 | 72.93 | -0.15417 | -0.16101 | 0.515698 | 0.561768 |
| 500 | 90.94 | -0.19227 | -0.20057 | 0.606764 | 0.664038 |
| 500 | 113.41 | -0.23871 | -0.24861 | 0.731372 | 0.803555 |
| 500 | 141.42 | -0.29495 | -0.30651 | 0.900999 | 0.992753 |
| 500 | 176.36 | -0.36254 | -0.37568 | 1.130442 | 1.24747 |
| 500 | 219.92 | -0.44301 | -0.45747 | 1.438431 | 1.58746 |
| 500 | 274.25 | -0.53778 | -0.55303 | 1.848175 | 2.036773 |
| 500 | 342 | -0.64802 | -0.66312 | 2.387711 | 2.623872 |
| 500 | 426.48 | -0.77442 | -0.78801 | 3.089918 | 3.38135 |
| 500 | 531.83 | -0.91703 | -0.92722 | 3.992076 | 4.345172 |
| 500 | 663.21 | -1.07503 | -1.07943 | 5.134856 | 5.55534 |
| 500 | 827.04 | -1.24665 | -1.24246 | 6.560776 | 7.044546 |
| 500 | 1031.34 | -1.42914 | -1.41329 | 8.312291 | 8.855778 |
| 500 | 1286.11 | -1.61887 | -1.5883 | 10.42983 | 11.02138 |
| 500 | 1603.81 | -1.81159 | -1.76358 | 12.95017 | 13.57184 |
| 500 | 2000 | -2.00282 | -1.93525 | 15.90568 | 16.53382 |

METHOD OF ESTIMATING ELECTRICAL PARAMETERS OF AN EARTH FORMATION WITH A SIMPLIFIED MEASUREMENT DEVICE MODEL

RELATED APPLICATIONS

This application is a continuation of U.S. patent application Ser. No. 10/086,043 filed Feb. 28, 2002 and a continuation-in-part of U.S. patent application Ser. No. 09/877,383 filed on Jun. 8, 2001, now U.S. Pat. No. 6,631,328, which itself is a continuation-in-part of U.S. patent application Ser. No. 09/608,205, filed Jun. 30, 2000, now U.S. Pat. No. 6,366,858.

FIELD OF THE INVENTION

The present invention generally relates to a method of estimating electrical parameters of an earth formation with a simplified measurement device model.

BACKGROUND OF THE INVENTION

Typical petroleum drilling operations employ a number of techniques to gather information about earth formations during and in conjunction with drilling operations such as Wireline Logging, Measurement-While-Drilling (MWD) and Logging-While-Drilling (LWD) operations. Physical values such as the electrical conductivity and the dielectric constant of an earth formation can indicate either the presence or absence of oil-bearing structures near a drill hole, or "borehole." A wealth of other information that is useful for oil well drilling and production is frequently derived from such measurements. Originally, a drill pipe and a drill bit were pulled from the borehole and then instruments were inserted into the hole in order to collect information about down hole conditions. This technique, or "wireline logging," can be expensive in terms of both money and time. In addition, wireline data may be of poor quality and difficult to interpret due to deterioration of the region near the borehole after drilling. These factors lead to the development of Logging-While-Drilling (LWD). LWD operations involve collecting the same type of information as wireline logging without the need to pull the drilling apparatus from the borehole. Since the data are taken while drilling, the measurements are often more representative of virgin formation conditions because the near-borehole region often deteriorates over time after the well is drilled. For example, the drilling fluid often penetrates or invades the rock over time, making it more difficult to determine whether the fluids observed within the rock are naturally occurring or drilling induced. Data acquired while drilling are often used to aid the drilling process. For example, MWD/LWD data can help a driller navigate the well so that the borehole is ideally positioned within an oil bearing structure. The distinction between LWD and MWD is not always obvious, but MWD usually refers to measurements taken for the purpose of drilling the well (such as navigation) whereas LWD is principally for the purpose of estimating the fluid production from the earth formation. These terms will hereafter be used synonymously and referred to collectively as "MWD/LWD."

In wireline logging, wireline induction measurements are commonly used to gather information used to calculate the electrical conductivity, or its inverse resistivity. See for example U.S. Pat. No. 5,157,605. A dielectric wireline tool is used to determine the dielectric constant and/or resistivity of an earth formation. This is typically done using measurements which are sensitive to the volume near the borehole wall. See for example U.S. Pat. No. 3,944,910. In MWD/LWD, a MWD/LWD resistivity tool is typically employed. Such devices are often called "propagation resistivity" or "wave resistivity" tools, and they operate at frequencies high enough that the measurement is sensitive to the dielectric constant under conditions of either high resistivity or a large dielectric constant. See for example U.S. Pat. Nos. 4,899,112 and 4,968,940. In MWD applications, resistivity measurements may be used for the purpose of evaluating the position of the borehole with respect to boundaries of the reservoir such as with respect to a nearby shale bed. The same resistivity tools used for LWD may also used for MWD; but, in LWD, other formation evaluation measurements including density and porosity are typically employed.

For purposes of this disclosure, the terms "resistivity" and "conductivity" will be used interchangeably with the understanding that they are inverses of each other and the measurement of either can be converted into the other by means of simple mathematical calculations. The terms "depth," "point(s) along the borehole," and "distance along the borehole axis" will also be used interchangeably. Since the borehole axis may be tilted with respect to the vertical, it is sometimes necessary to distinguish between the vertical depth and distance along the borehole axis. Should the vertical depth be referred to, it will be explicitly referred to as the "vertical depth."

Typically, the electrical conductivity of an earth formation is not measured directly. It is instead inferred from other measurements either taken during (MWD/LWD) or after (Wireline Logging) the drilling operation. In typical embodiments of MWD/LWD resistivity devices, the direct measurements are the magnitude and the phase shift of a transmitted electrical signal traveling past a receiver array. See for example U.S. Pat. Nos. 4,899,112, 4,968,940, or 5,811,973. In commonly practiced embodiments, the transmitter emits electrical signals of frequencies typically between four hundred thousand and two million cycles per second (0.4–2.0 MHz). Two induction coils spaced along the axis of the drill collar having magnetic moments substantially parallel to the axis of the drill collar typically comprise the receiver array. The transmitter is typically an induction coil spaced along the axis of a drill collar from the receiver with its magnetic moment substantially parallel to the axis of the drill collar. A frequently used mode of operation is to energize the transmitter for a long enough time to result in the signal being essentially a continuous wave (only a fraction of a second is needed at typical frequencies of operation). The magnitude and phase of the signal at one receiving coil is recorded relative to its value at the other receiving coil. The magnitude is often referred to as the attenuation, and the phase is often called the phase shift. Thus, the magnitude, or attenuation, and the phase shift, or phase, are typically derived from the ratio of the voltage at one receiver antenna relative to the voltage at another receiver antenna.

Commercially deployed MWD/LWD resistivity measurement systems use multiple transmitters; consequently, attenuation and phase-based resistivity values can be derived independently using each transmitter or from averages of signals from two or more transmitters. See for example U.S. Pat. No. 5,594,343.

As demonstrated in U.S. Pat. Nos. 4,968,940 and 4,899,112, a very common method practiced by those skilled in the art of MWD/LWD for determining the resistivity from the measured data is to transform the dielectric constant into a variable that depends on the resistivity and then to independently convert the phase shift and attenuation measurements to two separate resistivity values. A key assumption implicitly used in this practice is that each measurement senses the resistivity within the same volume that it senses the dielectric constant. This currently practiced method may provide significantly incorrect resistivity values, even in virtually homogeneous earth formations; and the errors may be even more severe in inhomogeneous formations. A MWD/LWD tool typically transmits a 2 MHz signal (although frequencies as low as 0.4 MHz are sometimes used). This frequency range is high enough to create difficulties in transforming the raw attenuation and phase measurements into accurate estimates of the resistivity and/or the dielectric constant. For example, the directly measured values are not linearly dependent on either the resistivity or the dielectric constant (this nonlinearity, known to those skilled in the art as "skin-effect," also limits the penetration of the fields into the earth formation). In addition, it is useful to separate the effects of the dielectric constant and the resistivity on the attenuation and phase measurements given that both the resistivity and the dielectric constant typically vary spatially within the earth formation. If the effects of both of these variables on the measurements are not separated, the estimate of the resistivity can be corrupted by the dielectric constant, and the estimate of the dielectric constant can be corrupted by the resistivity. Essentially, the utility of separating the effects is to obtain estimates of one parameter that do not depend on (are independent of) the other parameter. A commonly used current practice relies on assuming a correlative relationship between the resistivity and dielectric constant (i.e., to transform the dielectric constant into a variable that depends on the resistivity) and then calculating resistivity values independently from the attenuation and phase shift measurements that are consistent the correlative relationship. Differences between the resistivity values derived from corresponding phase and attenuation measurements are then ascribed to spatial variations (inhomogeneities) in the resistivity over the sensitive volume of the phase shift and attenuation measurements. See for example U.S. Pat. Nos. 4,899,112 and 4,968,940. An implicit and instrumental assumption in this method is that the attenuation measurement senses both the resistivity and dielectric constant within the same volume, and that the phase shift measurement senses both variables within the same volume (but not the same volume as the attenuation measurement). See for example U.S. Pat. Nos. 4,899,112 and 4,968,940. These assumptions facilitate the independent determination of a resistivity value from a phase measurement and another resistivity value from an attenuation measurement. However, the implicit assumption mentioned above is not true; so, the results determined using such algorithms are questionable.

Another technique for determining the resistivity and/or dielectric constant is to assume a model for the measurement apparatus in, for example, a homogeneous medium (no spatial variation in either the resistivity or dielectric constant) and then to determine values for the resistivity and dielectric constant that cause the model to agree with the measured phase shift and attenuation data. The resistivity and dielectric constant determined by the model are then correlated to the actual parameters of the earth formation. This method is thought to be valid only in a homogeneous medium because of the implicit assumption mentioned in the above paragraph. A recent publication by P. T. Wu, J. R. Lovell, B. Clark, S. D. Bonner, and J. R. Tabanou entitled "Dielectric-Independent 2-MHz Propagation Resistivities" (SPE 56448, 1999) (hereafter referred to as "Wu") demonstrates that such assumptions are used by those skilled in the art. For example, Wu states: "One fundamental assumption in the computation of Rex is an uninvaded homogeneous formation. This is because the phase shift and attenuation investigate slightly different volumes." Abandoning the false assumptions applied in this practice results in estimates of one parameter (i.e., the resistivity or dielectric constant) that have no net sensitivity to the other parameter. This desirable and previously unknown property of the results is very useful because earth formations are commonly inhomogeneous.

Wireline dielectric measurement tools commonly use electrical signals having frequencies in the range 20 MHz–1.1 GHz. In this range, the skin-effect is even more severe, and it is even more useful to separate the effects of the dielectric constant and resistivity. Those skilled in the art of dielectric measurements have also falsely assumed that a measurement (either attenuation or phase) senses both the resistivity and dielectric constant within the same volume. The design of the measurement equipment and interpretation of the data both reflect this. See for example U.S. Pat. Nos. 4,185,238 and 4,209,747.

Wireline induction measurements are typically not attenuation and phase, but instead the real (R) and imaginary (X) parts of the voltage across a receiver antenna which consists of several induction coils in electrical series. For the purpose of this disclosure, the R-signal for a wireline induction measurement corresponds to the phase measurement of a MWD/LWD resistivity or wireline dielectric tool, and the X-signal for a wireline induction measurement corresponds to the attenuation measurement of a MWD/LWD resistivity or wireline dielectric device. Wireline induction tools typically operate using electrical signals at frequencies from 8–200 kHz (most commonly at approximately 20 kHz). This frequency range is too low for significant dielectric sensitivity in normally encountered cases; however, the skin-effect can corrupt the wireline induction measurements. As mentioned above, the skin-effect shows up as a non-linearity in the measurement as a function of the formation conductivity, and also as a dependence of the measurement sensitivity values on the formation conductivity. Estimates of the formation conductivity from wireline induction devices are often derived from data processing algorithms which assume the tool response function is the same at all depths within the processing window. The techniques disclosed in the commonly-assigned U.S. patent application, Ser. No. 09/877,383, entitled "Method of Determining Resistivity of an Earth Formation with Phase Resistivity Evaluation Based on a Phase Shift Measurement and Attenuation Resistivity Evaluation Based on an Attenuation Measurement and the Phase Shift Measurement," can be applied to wireline induction measurements for the purpose of deriving resistivity values without assuming the tool response function is the same at all depths within the processing window as is done in U.S. Pat. No. 5,157,605. In order to make such an assumption, a background conductivity, $\sigma$, that applies for the data within the processing window is commonly used. Practicing an embodiment as disclosed in the above referenced, commonly assigned U.S. Patent Application reduces the dependence of the results on the accuracy of the estimates for the background parameters because the background parameters are not required to be the same at all depths within the processing window. Another advantage is reduction of the need to perform steps to correct wireline induction data for the skin effect. Such parameterization as disclosed in the above referenced, commonly assigned U.S. Patent Application, however, has not fully taken into account complications such as invaded zones and frequency dispersion.

SUMMARY OF THE INVENTION

Briefly, a method of estimating electrical parameters of an earth formation employs a simplified model of a measurement tool or device in transforming or normalizing data measured by the measurement tool. Electrical parameters of the earth formation, such as conductivity or dielectric constant, for example, may be estimated based on the normalized data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 is a portion of a table of background medium values and integral values employed in a disclosed embodiment;

FIG. 10 is a table of exemplary data values for a medium spaced 2 MHz measurement described in conjunction with FIG. 7;

FIG. 11 is a table of exemplary data values for a medium spaced 2 MHz measurement illustrating the difference between measured attenuation and phase-shift values and corresponding point-dipole attenuation and phase-shift values for a fixed resistivity as a function of the dielectric constant;

DETAILED DESCRIPTION

Figure 1:
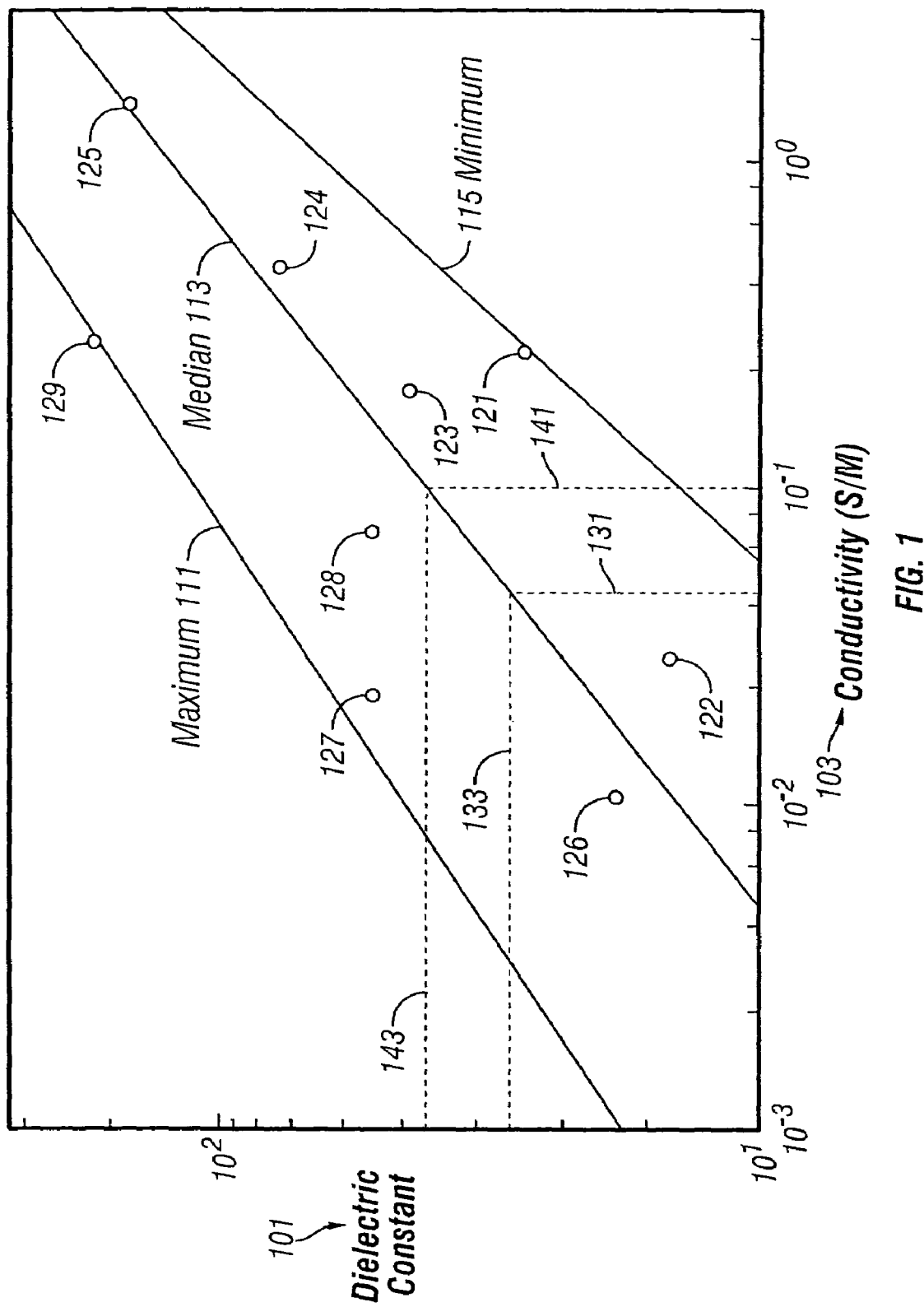
FIG. 1 is a plot of multiple laboratory measurements on rock samples representing the relationship between the conductivity and the dielectric constant in a variety of geological media.

Some of the disclosed embodiments are relevant to both wireline induction and dielectric applications, as well as Measurement-While-Drilling and Logging-While-Drilling (MWD/LWD) applications. Turning now to the figures, FIG. 1 is a plot of measurements of the conductivity and dielectric constant determined by laboratory measurements on a variety of rock samples from different geological environments. The points 121 through 129 represent measured values of conductivity and dielectric constant (electrical parameters) for carbonate and sandstone earth formations. For instance, the point 126 represents a sample with a conductivity value of 0.01 ($10^{-2}$) siemens per meter (S/m) and a relative dielectric constant of approximately 22. It should be noted that both the conductivity scale and the dielectric scale are logarithmic scales; so, the data would appear to be much more scattered if they were plotted on linear scales.

The maximum boundary 111 indicates the maximum dielectric constant expected to be observed at each corresponding conductivity. In a similar fashion, the minimum boundary 115 represents the minimum dielectric constant expected to be observed at each corresponding conductivity. The points 122 through 128 represent measured values that fall somewhere in between the minimum boundary 115 and the maximum boundary 111. A median line 113 is a line drawn so that half the points, or points 121 through 124 are below the median line 113 and half the points, or points 126 through 129 are above the median line 113. The point 125 falls right on top of the median line 113.

Figure 3:
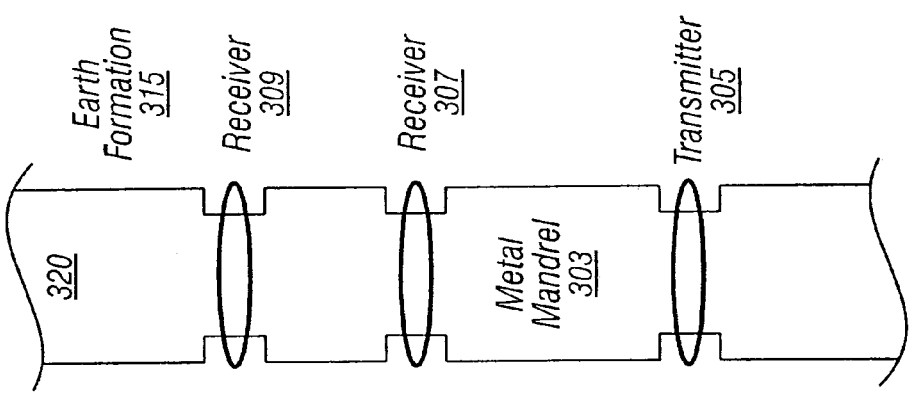
FIG. 3 illustrates an exemplary one-transmitter, two-receiver MWD/LWD tool commonly referred to as an uncompensated measurement device.
Figure 2:
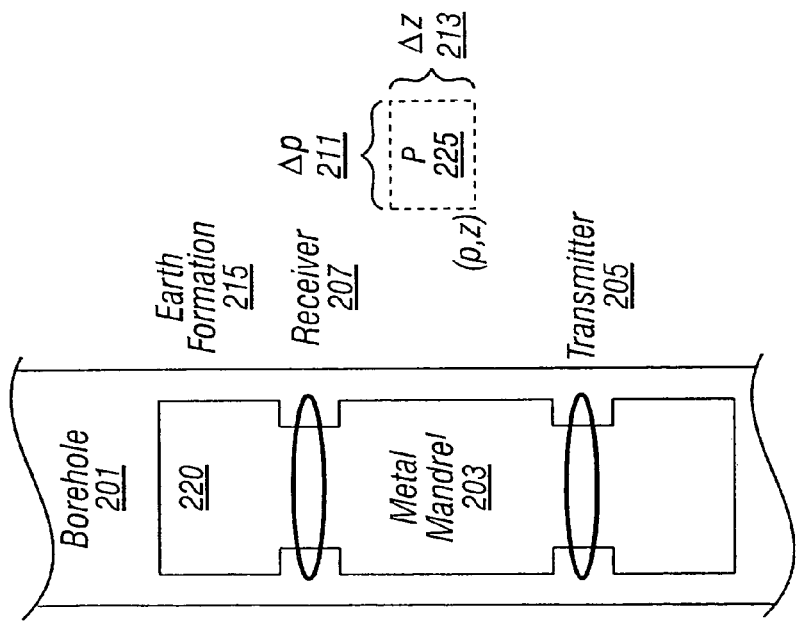
FIG. 2 illustrates the derivation of a sensitivity function in relation to an exemplary one-transmitter, one-receiver MWD/LWD resistivity tool.

An elemental measurement between a single transmitting coil 205 and a single receiving coil 207 is difficult to achieve in practice, but it is useful for describing the sensitivity of the measurement to variations of the conductivity and dielectric constant within a localized volume 225 of an earth formation 215. FIG. 2 illustrates in more detail specifically what is meant by the term "sensitivity function," also referred to as a "response function" or "geometrical factors." Practitioners skilled in the art of wireline logging, Measurement-While-Drilling (MWD) and Logging-While-Drilling (LWD) are familiar with how to generalize the concept of a sensitivity function to apply to realistic measurements from devices using multiple transmitting and receiving antennas. Typically a MWD/LWD resistivity measurement device transmits a signal using a transmitter coil and measures the phase and magnitude of the signal at one receiver antenna 307 relative to the values of the phase and the magnitude at another receiver antenna 309 within a borehole 301 (FIG. 3). These relative values are commonly referred to as the phase shift and attenuation. It should be understood that one way to represent a complex signal with multiple components is as a phasor signal.

Sensitivity Functions

Figure 4:
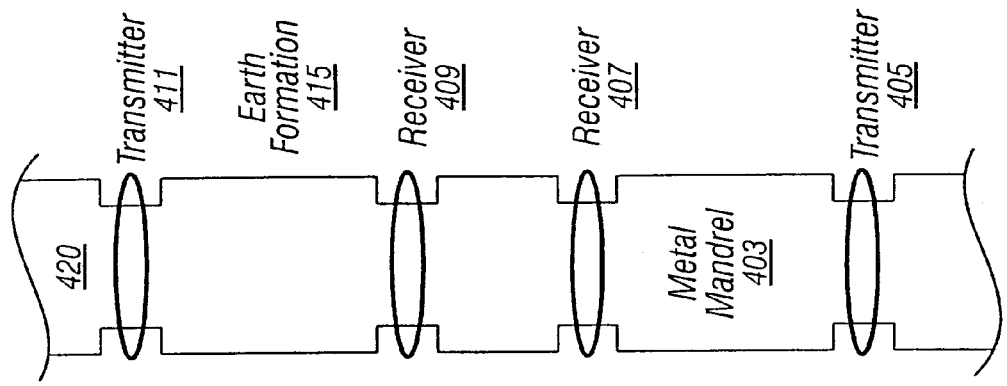
FIG. 4 illustrates an exemplary two-transmitter, two-receiver MWD/LWD tool, commonly referred to as a compensated measurement device.

FIG. 2 illustrates an exemplary single transmitter, single receiver MWD/LWD resistivity tool 220 for investigating an earth formation 215. A metal shaft, or "mandrel," 203 is incorporated within the drill string (the drill string is not shown, but it is a series of pipes screwed together with a drill bit on the end), inserted into the borehole 201, and employed to take measurements of an electrical signal that originates at a transmitter 205 and is sensed at a receiver 207. The measurement tool is usually not removed from the well until the drill string is removed for the purpose of changing drill bits or because drilling is completed. Selected data from the tool are telemetered to the surface while drilling. All data are typically recorded in memory banks for retrieval after the tool is removed from the borehole 201. Devices with a single transmitter and a single receiver are usually not used in practice, but they are helpful for developing concepts such as that of the sensitivity function. Schematic drawings of simple, practical apparatuses are shown in FIGS. 3 and 4.

In a wireline operation, the measurement apparatus is connected to a cable (known as a wireline), lowered into the borehole 201, and data are acquired. This is done typically after the drilling operation is finished. Wireline induction tools measure the real (R) and imaginary (X) components of the receiver 207 signal. The R and X-signals correspond to the phase shift and attenuation measurements respectively. In order to correlate the sensitivity of the phase shift and attenuation measurements to variations in the conductivity and dielectric constant of the earth formation 215 at different positions within the earth formation, the conductivity and dielectric constant within a small volume P 225 are varied. For simplicity, the volume P 225 is a solid of revolution about the tool axis (such a volume is called a two-dimensional volume). The amount the phase and attenuation measurements change relative to the amount the conductivity and dielectric constant changed within P 225 is essentially the sensitivity. The sensitivity function primarily depends on the location of the point P 225 relative to the locations of the transmitter 205 and receiver 207, on the properties of the earth formation 215, and on the excitation frequency. It also depends on other variables such as the diameter and composition of the mandrel 203, especially when P is near the surface of the mandrel 203.

Although the analysis is carried out in two-dimensions, the important conclusions regarding the sensitive volumes of phase shift and attenuation measurements with respect to the conductivity and dielectric constant hold in three-dimensions. Consequently, the scope of this application is not limited to two-dimensional cases. This is discussed more in a subsequent section entitled, "ITERATIVE FORWARD MODELING AND DIPPING BEDS."

The sensitivity function can be represented as a complex number having a real and an imaginary part. In the notation used below, S, denotes a complex sensitivity function, and its real part is S', and its imaginary part is S". Thus, S=S'+iS", in which the imaginary number $i=\sqrt{-1}$. The quantities S' and S" are commonly referred to as geometrical factors or response functions. The volume P 225 is located a distance ρ in the radial direction from the tool's axis and a distance z in the axial direction from the receiver 206. S' represents the sensitivity of attenuation to resistivity and the sensitivity of phase shift to dielectric constant. Likewise, S" represents the sensitivity of attenuation to dielectric constant and the sensitivity of phase shift to resistivity. The width of the volume P 225 is Δρ 211 and the height of the volume P 225 is Δz 213. The quantity S', or the sensitivity of attenuation to resistivity, is calculated by determining the effect a change in the conductivity (reciprocal of resistivity) in volume P 225 from a prescribed background value has on the attenuation of a signal between the transmitter 205 and the receiver 207, assuming the background conductivity value is otherwise unperturbed within the entire earth formation 215. In a similar fashion, S", or the sensitivity of the phase to the resistivity, is calculated by determining the effect a change in the conductivity value in the volume P 225 from an assumed background conductivity value has on the phase of the signal between the transmitter 205 and the receiver 207, assuming the background parameters are otherwise unperturbed within the earth formation 215. Alternatively, one could determine S' and S" by determining the effect a change in the dielectric constant within the volume P 225 has on the phase and attenuation, respectively. When the sensitivities are determined by considering a perturbation to the dielectric constant value within the volume P 225, it is apparent that the sensitivity of the attenuation to changes in the dielectric constant is the same as the sensitivity of the phase to the conductivity. It is also apparent that the sensitivity of the phase to the dielectric constant is the same as the sensitivity of the attenuation to the conductivity. By simultaneously considering the sensitivities of both the phase and attenuation measurement to the dielectric constant and to the conductivity, the Applicant shows a previously unknown relationship between the attenuation and phase shift measurements and the conductivity and dielectric constant values. By employing this previously unknown relationship, the Applicant provides techniques that produce better estimates of both the conductivity and the dielectric constant values than was previously available from those with skill in the art. The sensitivity functions S' and S" and their relation to the subject matter of the Applicant's disclosure is explained in more detail below in conjunction with FIGS. 5a–d and FIGS. 6a–d.

In the above, sensitivities to the dielectric constant were referred to. Strictly speaking, the sensitivity to the radian frequency ω times the dielectric constant should have been referred to. This distinction is trivial to those skilled in the art.

In FIG. 2, if the background conductivity (reciprocal of resistivity) of the earth formation 215 is $\sigma_0$ and the background dielectric constant of the earth formation 215 is $\in_0$, then the ratio of the receiver 207 voltage to the transmitter 205 current in the background medium can be expressed as $Z_{RT}^0$, where R stands for the receiver 207 and T stands for the transmitter 205. Hereafter, a numbered subscript or superscript such as the '0' is merely used to identify a specific incidence of the corresponding variable or function. If an exponent is used, the variable or function being raised to the power indicated by the exponent will be surrounded by parentheses and the exponent will be placed outside the parentheses. For example $(L_1)^3$ would represent the variable $L_1$ raised to the third power.

When the background conductivity $\sigma_0$ and/or dielectric constant $\in_0$ are replaced new values $\sigma_1$, and/or $\in_1$ in the volume P 225, the ratio between the receiver 207 voltage to the transmitter 205 current is represented by $Z_{RT}^1$. Using the same nomenclature, a ratio between a voltage at a hypothetical receiver placed in the volume P 225 and the current at the transmitter 205 can be expressed as $Z_{PT}^0$. In addition, a ratio between the voltage at the receiver 207 and a current at a hypothetical transmitter in the volume P 225 can be expressed as $Z_{RP}^0$. Using the Born approximation, it can be shown that, $$\frac{Z_{RT}^1}{Z_{RT}^0} = 1 + S(T, R, P)\Delta\tilde{\sigma}\Delta\rho\Delta z$$

where the sensitivity function, defined as S(T,R,P), is $$S(T, R, P) = -\frac{Z_{RP}^0 Z_{PT}^0}{2\pi\rho Z_{RT}^0}$$

in which $\Delta\tilde{\sigma}=\tilde{\sigma}_1-\tilde{\sigma}_0=(\sigma_1-\sigma_0)+i\omega(\in_1-\in_0)$, and the radian frequency of the transmitter current is $\omega=2\pi f$. A measurement of this type, in which there is just one transmitter 205 and one receiver 207, is defined as an "elemental" measurement. It should be noted that the above result is also valid if the background medium parameters vary spatially within the earth formation 215. In the above equations, both the sensitivity function S(T, R, P) and the perturbation $\Delta\tilde{\sigma}$ are complex-valued. Some disclosed embodiments consistently treat the measurements, their sensitivities, and the parameters to be estimated as complex-valued functions. This is not done in the prior art.

The above sensitivity function of the form S(T, R, P) is referred to as a 2-D (or two-dimensional) sensitivity function because the volume $\Delta\rho\Delta z$ surrounding the point P 225, is a solid of revolution about the axis of the tool 201. Because the Born approximation was used, the sensitivity function S depends only on the properties of the background medium because it is assumed that the same field is incident on the point $P(\rho, z)$ even though the background parameters have been replaced by $\tilde{\sigma}_1$.

FIG. 3 illustrates an exemplary one-transmitter, two-receiver MWD/LWD resistivity measurement apparatus 320 for investigating an earth formation 315. Due to its configuration, the tool 320 is defined as an "uncompensated" device and collects uncompensated measurements from the earth formation 315. For the sake of simplicity, a borehole is not shown. This measurement tool 320 includes a transmitter 305 and two receivers 307 and 309, each of which is incorporated into a metal mandrel 303. Typically, the measurement made by such a device is the ratio of the voltages at receivers 307 and 309. In this example, using the notation described above in conjunction with FIG. 2, the sensitivity function S(T, R, R', P) for the uncompensated device can be shown to be the difference between the elemental sensitivity functions S(T,R,P) and S(T, R', P), where T represents the transmitter 305, R represents the receiver 307, R' represents the receiver 309, and P represents a volume (not shown) similar to the volume P 225 of FIG. 2.

For wireline induction measurements, the voltage at the receiver R is subtracted from the voltage at the receiver R', and the position and number of turns of wire for R are commonly chosen so that the difference in the voltages at the two receiver antennas is zero when the tool is in a nonconductive medium. For MWD/LWD resistivity and wireline dielectric constant measurements, the voltage at the receiver R, or $V_R$, and the voltage at the receiver R', or $V_{R'}$, are examined as the ratio $V_R/V_{R'}$. In either case, it can be shown that $$S(T,R,R',P)=S(T,R,P)-S(T,R',P).$$

The sensitivity for an uncompensated measurement is the difference between the sensitivities of two elemental measurements such as S(T,R,P) and S(T, R', P) calculated as described above in conjunction with FIG. 2.

FIG. 4 illustrates an exemplary two-transmitter, two-receiver MWD/LWD resistivity tool 420. Due to its configuration (transmitters being disposed symmetrically), the tool 420 is defined as a "compensated" tool and collects compensated measurements from an earth formation 415. The tool 420 includes two transmitters 405 and 411 and two receivers 407 and 409, each of which is incorporated into a metal mandrel or collar 403. Each compensated measurement is the geometric mean of two corresponding uncompensated measurements. In other words, during a particular timeframe, the tool 420 performs two uncompensated measurements, one employing transmitter 405 and the receivers 407 and 409 and the other employing the transmitter 411 and the receivers 409 and 407. These two uncompensated measurements are similar to the uncompensated measurement described above in conjunction with FIG. 3. The sensitivity function S of the tool 420 is then defined as the arithmetic average of the sensitivity functions for each of the uncompensated measurements. Another way to describe this relationship is with the following formula:

$$S(T, R, R', T', P) = \frac{1}{2}[S(T, R, R', P) + S(T', R', R, P)]$$

where T represents transmitter 405, T' represents transmitter 411, R represents receiver 407, R' represents receiver 409 and P represents a small volume of the earth formation similar to 225 (FIG. 2).

The techniques of the disclosed embodiments are explained in terms of a compensated tool such as the tool 420 and compensated measurements such as those described in conjunction with FIG. 4. However, it should be understood that the techniques also apply to uncompensated tools such as the tool 320 and uncompensated measurements described above in conjunction with FIG. 3 and elemental tools such as the tool 220 and elemental measurements such as those described above in conjunction with FIG. 2. In addition, the techniques are applicable for use in a wireline system, a system that may not incorporate its transmitters and receivers into a metal mandrel, but may rather affix a transmitter and a receiver to a tool made of a non-conducting material such as fiberglass. The wireline induction frequency is typically too low for dielectric effects to be significant. Also typical for wireline induction systems is to select the position and number of turns of groups of receiver antennas so that there is a null signal in a nonconductive medium. When this is done, $Z_{RT}^0=0$ if $\tilde{\sigma}_0=0$. As a result, it is necessary to multiply the sensitivity and other quantities by $Z_{RT}^0$ to use the formulation given here in such cases.

The quantity $ZR_{RT}^1/Z_{RT}^0$ can be expressed as a complex number which has both a magnitude and a phase (or alternatively real and imaginary parts). To a good approximation, the raw attenuation value (which corresponds to the magnitude) is:

$$\left|\frac{Z_{RT}^1}{Z_{RT}^0}\right| \approx \text{Re}\left[\frac{Z_{RT}^1}{Z_{RT}^0}\right] =$$

$$1 + \text{Re}[S(T, R, P)\Delta\tilde{\sigma}]\Delta\rho\Delta z = 1 + [S'\Delta\sigma - S''\omega\Delta\varepsilon]\Delta\rho\Delta z$$

where the function Re[·] denotes the real part of its argument. Also, to a good approximation, the raw phase shift value is:

$$\text{phase}\left(\frac{Z_{RT}^1}{Z_{RT}^0}\right) \approx \text{Im}\left[\frac{Z_{RT}^1}{Z_{RT}^0}\right] = \text{Im}[S(T, R, P)\Delta\tilde{\sigma}]\Delta\rho\Delta z = [S''\Delta\sigma + S'\omega\Delta\varepsilon]\Delta\rho\Delta z$$

in which Im[·] denotes the imaginary part of its argument, $S(T, R, P)=S'+iS''$, $\Delta\sigma=\sigma_1-\sigma_0$, and $\Delta\in=\in_1-\in_0$. For the attenuation measurement, S' is the sensitivity to the resistivity and S" is the sensitivity to the dielectric constant. For the phase shift measurement, S' is the sensitivity to the dielectric constant and S" is the sensitivity to the resistivity. This is apparent because S' is the coefficient of $\Delta\sigma$ in the equation for attenuation, and it is also the coefficient of $\omega\Delta\in$ in the equation for the phase shift. Similarly, S" is the coefficient of $\Delta\sigma$ in the equation for the phase shift, and it is also the coefficient for $-\omega\Delta\in$ in the equation for attenuation. This implies that the attenuation measurement senses the resistivity in the same volume as the phase shift measurement senses the dielectric constant and that the phase shift measurement senses the resistivity in the same volume as the attenuation measurement senses the dielectric constant. In the above, we have referred to sensitivities to the dielectric constant. Strictly speaking, the sensitivity to the radian frequency $\omega$ times the dielectric constant $\Delta\in$ should have been referred to. This distinction is trivial to those skilled in the art.

The above conclusion regarding the volumes in which phase and attenuation measurements sense the resistivity and dielectric constant from Applicant's derived equations also follows from a well known result from complex variable theory known in that art as the Cauchy-Reimann equations. These equations provide the relationship between the derivatives of the real and imaginary parts of an analytic complex function with respect to the real and imaginary parts of the function's argument.

Figure 5A:
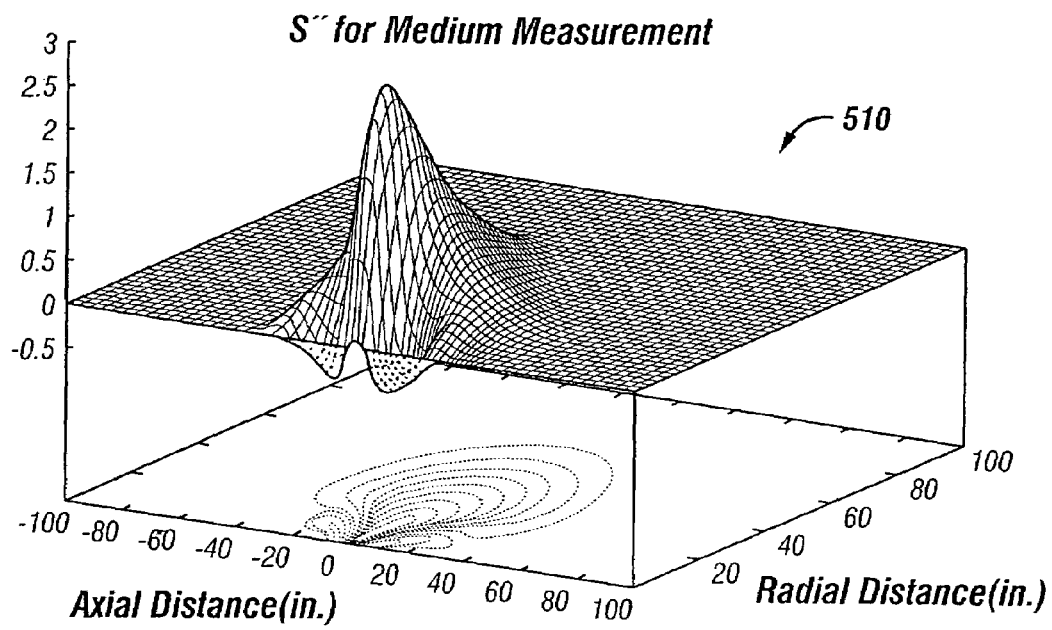
FIGS. 5*a*, 5*b*, 5*c* and 5*d* are exemplary sensitivity function plots for Deep and Medium attenuation and phase shift measurements.
Figure 5B:
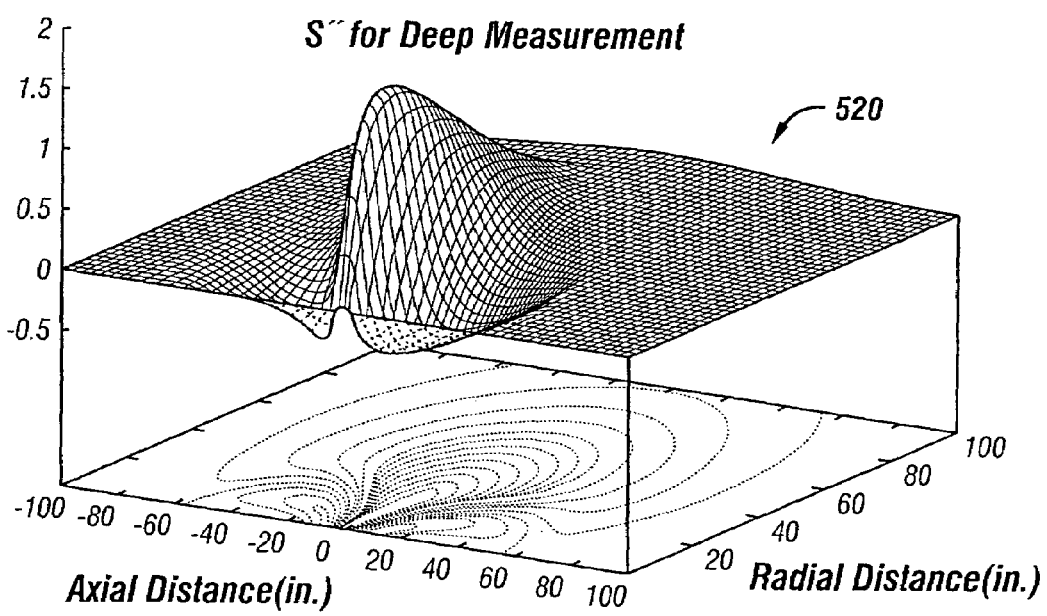
Figure 5C:
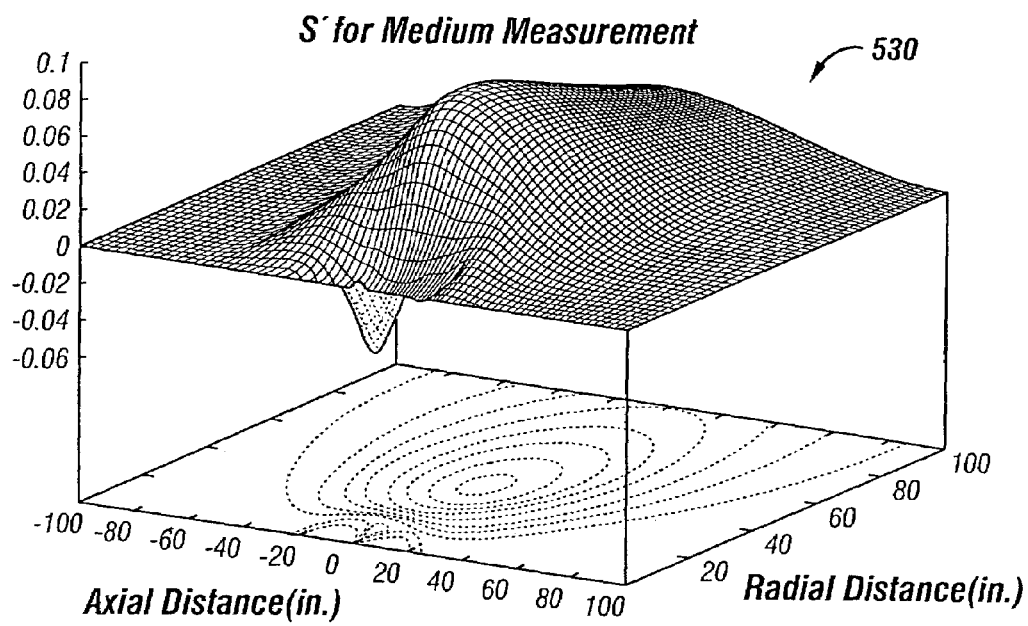
Figure 5D:
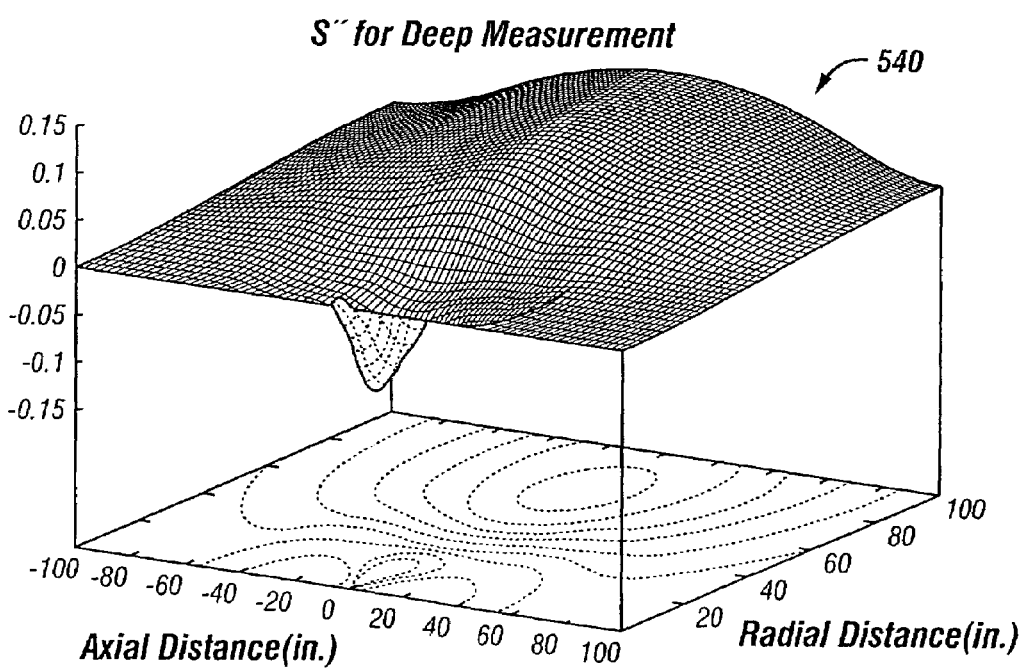

FIGS. 5a, 5b, 5c and 5d can best be described and understood together. In all cases, the mandrel diameter is 6.75 inches, the transmitter frequency is 2 MHz, and the background medium is characterized by a conductivity of $\sigma_0=0.01$ S/m and a relative dielectric constant of $\in_0=10$. The data in FIGS. 5a and 5c labeled "Medium Measurement" are for a compensated type of design shown in FIG. 4. The exemplary distances between transmitter 405 and receivers 407 and 409 are 20 and 30 inches, respectively. Since the tool is symmetric, the distances between transmitter 411 and receivers 409 and 407 are 20 and 30 inches, respectively. The data in FIGS. 5b and 5d labeled "Deep Measurement" are also for a compensated tool as shown in FIG. 4, but with exemplary transmitter-receiver spacings of 50 and 60 inches. Each plot shows the sensitivity of a given measurement as a function of position within the formation. The term sensitive volume refers to the shape of each plot as well as its value at any point in the formation. The axes labeled "Axial Distance" refer to the coordinate along the axis of the tool with zero being the geometric mid-point of the antenna array (halfway between receivers 407 and 409) to a given point in the formation. The axes labeled "Radial Distance" refer to the radial distance from the axis of the tool to a given point in the formation. The value on the vertical axis is actually the sensitivity value for the indicated measurement. Thus, FIG. 5a is a plot of a sensitivity function that illustrates the sensitivity of the "Medium" phase shift measurement in relation to changes in the resistivity as a function of the location of the point P 225 in the earth formation 215 (FIG. 2). If the measurement of phase shift changes significantly in response to changing the resistivity from its background value, then phase shift is considered relatively sensitive to the resistivity at the point P 225. If the measurement of phase shift does not change significantly in response to changing the resistivity, then the phase shift is considered relatively insensitive at the point P 225. Based upon the relationship disclosed herein, FIG. 5a also illustrates the sensitivity of the "Medium" attenuation measurement in relation to changes in dielectric constant values. Note that the dimensions of the sensitivity on the vertical axes is ohms per meter ($\Omega$/m) and distances on the horizontal axes are listed in inches. In a similar fashion, FIG. 5b is a plot of the sensitivity of the attenuation measurement to the resistivity. Based on the relationship disclosed herein, FIG. 5b is also the sensitivity of a phase shift measurement to a change in the dielectric constant. FIGS. 5b and 5d have the same descriptions as FIGS. 5a and 5c, respectively, but FIGS. 5b and 5d are for the "Deep Measurement" with the antenna spacings described above.

Note that the shape of FIG. 5a is very dissimilar to the shape of FIG. 5c. This means that the underlying measurements are sensitive to the variables in different volumes. For example, the Medium phase shift measurement has a sensitive volume characterized by FIG. 5a for the resistivity, but this measurement has the sensitive volume shown in FIG. 5c for the dielectric constant. FIGS. 5a–5d illustrate that for a particular measurement the surface S" is more localized than the surface S' such that the sensitive volume associated with the surface S' substantially encloses the sensitive volume associated with S" for the corresponding measurement. As discussed below, it is possible to transform an attenuation and a phase shift measurement to a complex number which has the following desirable properties: 1) its real part is sensitive to the resistivity in the same volume that the imaginary part is sensitive to the dielectric constant; 2) the real part has no net sensitivity to the dielectric constant; and, 3) the imaginary part has no net sensitivity to the resistivity. In addition, the transformation is generalized to accommodate multiple measurements acquired at multiple depths. The generalized method can be used to produce independent estimates of the resistivity and dielectric constant within a plurality of volumes within the earth formation.

Transformed Sensitivity Functions and Transformation of the Measurements

For simplicity, the phase shift and attenuation will not be used. Hereafter, the real and imaginary parts of measurement will be referred to instead. Thus, $$w=w'+iw''$$

$$w'=(10)^{dB/20}\times\cos(\theta)$$

$$w''=(10)^{dB/20}\times\sin(\theta)$$

where w' is the real part of w, w" is the imaginary part of w, i is the square root of the integer −1, dB is the attenuation in decibels, and $\theta$ is the phase shift in radians.

The equations that follow can be related to the sensitivity functions described above in conjunction with FIG. 2 by defining variables $w_1=Z_{RT}^1$ and $w_0=Z_{RT}^0$. The variable $w_1$ denotes an actual tool measurement in the earth formation 215. The variable $w_0$ denotes the expected value for the tool measurement in the background earth formation 215. For realistic measurement devices such as those described in FIGS. 3 and 4, the values for $w_1$ and $w_0$ would be the voltage ratios defined in the detailed description of FIGS. 3 and 4. In one embodiment, the parameters for the background medium are determined and then used to calculate value of $w_0$ using a mathematical model to evaluate the tool response in the background medium. One of many alternative methods to determine the background medium parameters is to estimate $w_0$ directly from the measurements, and then to determine the background parameters by correlating $w_0$ to a model of the tool in the formation which has the background parameters as inputs.

As explained in conjunction with FIG. 2, the sensitivity function S relates the change in the measurement to a change in the medium parameters such as resistivity and dielectric constant within a small volume 225 of the earth formation 215 at a prescribed location in the earth formation 225, or background medium. A change in measurements due to small variations in the medium parameters at a range of locations can be calculated by integrating the responses from each such volume in the earth formation 215. Thus, if $\Delta\tilde{\sigma}$ is defined for a large number of points $\rho$, z, then $$Z_{RT}^1 = Z_{RT}^0(1 + I[S\Delta\tilde{\sigma}])$$

in which I is a spatial integral function further defined as $$I[F] = \int_{-\infty}^{+\infty} dz \int_0^{+\infty} d\rho F(\rho, z)$$

where F is a complex function.

Although the perturbation from the background medium, $\Delta\tilde{\sigma}$ is a function of position, parameters of a hypothetical, equivalent homogeneous perturbation (meaning that no spatial variations are assumed in the difference between the resistivity and dielectric constant and values for both of these parameters in the background medium) can be determined by assuming the perturbation is not a function of position and then solving for it. Thus, $$\Delta\hat{\sigma}I[S] = I[S\Delta\tilde{\sigma}]$$

where $\Delta\hat{\sigma}$ represents the parameters of the equivalent homogeneous perturbation. From the previous equations, it is clear that $$\Delta\hat{\sigma} = \frac{I[S\Delta\tilde{\sigma}]}{I[S]} = I[\hat{S}\Delta\tilde{\sigma}] = \frac{1}{I[S]}\left(\frac{w_1}{w_0} - 1\right)$$

and $$\hat{S} = \frac{S}{I[S]}$$

where $\Delta\hat{\sigma}$ is the transformed measurement (it is understood that $\Delta\hat{\sigma}$ is also the equivalent homogeneous perturbation and that the terms transformed measurement and equivalent homogeneous perturbation will be used synonymously), $\hat{S}$ is the sensitivity function for the transformed measurement, and $\hat{S}$ will be referred to as the transformed sensitivity function. In the above, $w_1$ is the actual measurement, and $w_0$ is the value assumed by the measurement in the background medium. An analysis of the transformed sensitivity function $\hat{S}$, shows that the transformed measurements have the following properties: 1) the real part of $\Delta\hat{\sigma}$ is sensitive to the resistivity in the same volume that its imaginary part is sensitive to the dielectric constant; 2) the real part of $\Delta\hat{\sigma}$ has no net sensitivity to the dielectric constant; and, 3) the imaginary part of $\Delta\hat{\sigma}$ has no net sensitivity to the resistivity. Details of this analysis will be given in the next few paragraphs.

The techniques of the disclosed embodiment can be further refined by introducing a calibration factor c (which is generally a complex number that may depend on the temperature of the measurement apparatus and other environmental variables) to adjust for anomalies in the physical measurement apparatus. In addition, the term, $w_{bh}$ can be introduced to adjust for effects caused by the borehole 201 on the measurement. With these modifications, the transformation equation becomes $$\Delta\hat{\sigma} = \frac{I[S\Delta\tilde{\sigma}]}{I[S]} = I[\hat{S}\Delta\tilde{\sigma}] = \frac{1}{I[S]}\left(\frac{cw_1 - w_{bh}}{w_0} - 1\right).$$

The sensitivity function for the transformed measurement is determined by applying the transformation to the original sensitivity function, S. Thus, $$\hat{S} = \hat{S}' + i\hat{S}'' = \frac{S}{I[S]} = \frac{S'I[S'] + S''I[S'']}{|I[S]|^2} + i\frac{S''I[S'] + S'I[S'']}{|I[S]|^2}.$$

Note that $I[\hat{S}] = I[\hat{S}'] = 1$ because $I[\hat{S}''] = 0$. The parameters for the equivalent homogeneous perturbation are $$\Delta\hat{\sigma}' = \hat{\sigma}_1 - \sigma_0 = I[\hat{S}'\Delta\sigma] - I[\hat{S}''\omega\Delta\in]$$

$$\Delta\hat{\sigma}'' = \omega(\hat{\in}_1 - \in_0) = I[\hat{S}'\omega\Delta\in] + I[\hat{S}''\Delta\sigma].$$

The estimate for the conductivity perturbation, $\Delta\hat{\sigma}'$ suppresses sensitivity (is relatively insensitive) to the dielectric constant perturbation, and the estimate of the dielectric constant perturbation, $\Delta\hat{\sigma}''/\omega$ suppresses sensitivity to the conductivity perturbation. This is apparent because the coefficient of the suppressed variable is $\hat{S}''$. In fact, the estimate for the conductivity perturbation $\Delta\hat{\sigma}'$ is independent of the dielectric constant perturbation provided that deviations in the dielectric constant from its background are such that $I[\hat{S}''\omega\Delta\in] = 0$. Since $I[\hat{S}''] = 0$, this is apparently the case if $\omega\Delta\in$ is independent of position. Likewise, the estimate for the dielectric constant perturbation given by $\Delta\hat{\sigma}''/\omega$ is independent of the conductivity perturbation provided that deviations in the conductivity from its background value are such that $I[\hat{S}''\Delta\sigma] = 0$. Since $I[\hat{S}''] = 0$, this is apparently the case if $\Delta\sigma$ is independent of position.

Figure 6A:
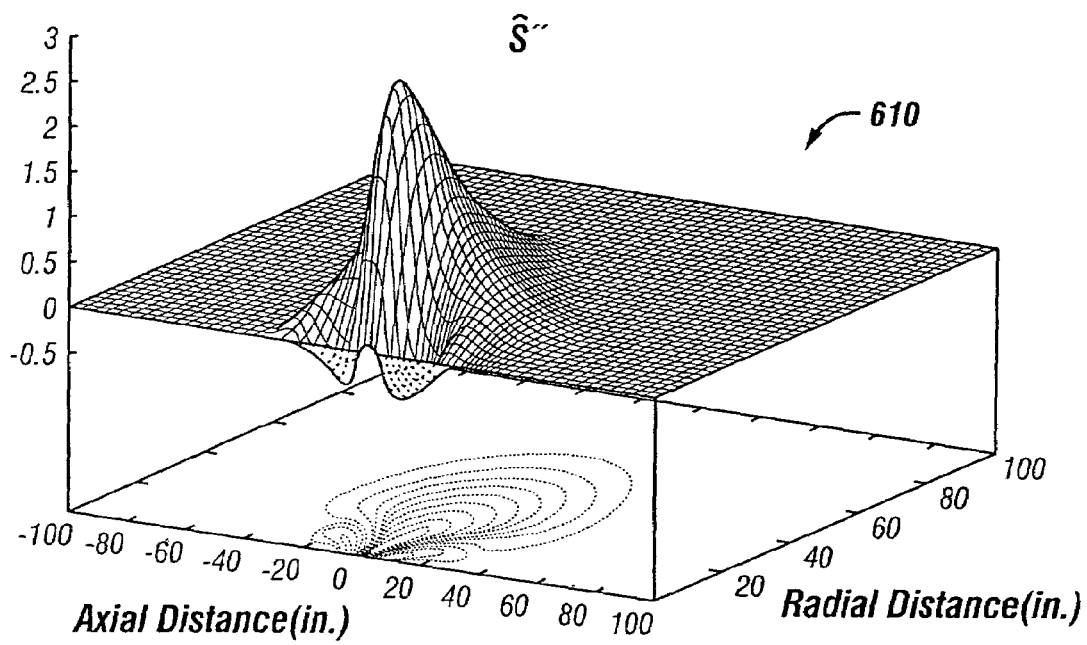
FIGS. 6*a*, 6*b*, 6*c* and 6*d* are plots of the sensitivity functions for the Deep and Medium measurements of FIGS. 5*a*, 5*b*, 5*c* and 5*d* respectively transformed according to the techniques of a disclosed embodiment.
Figure 6B:
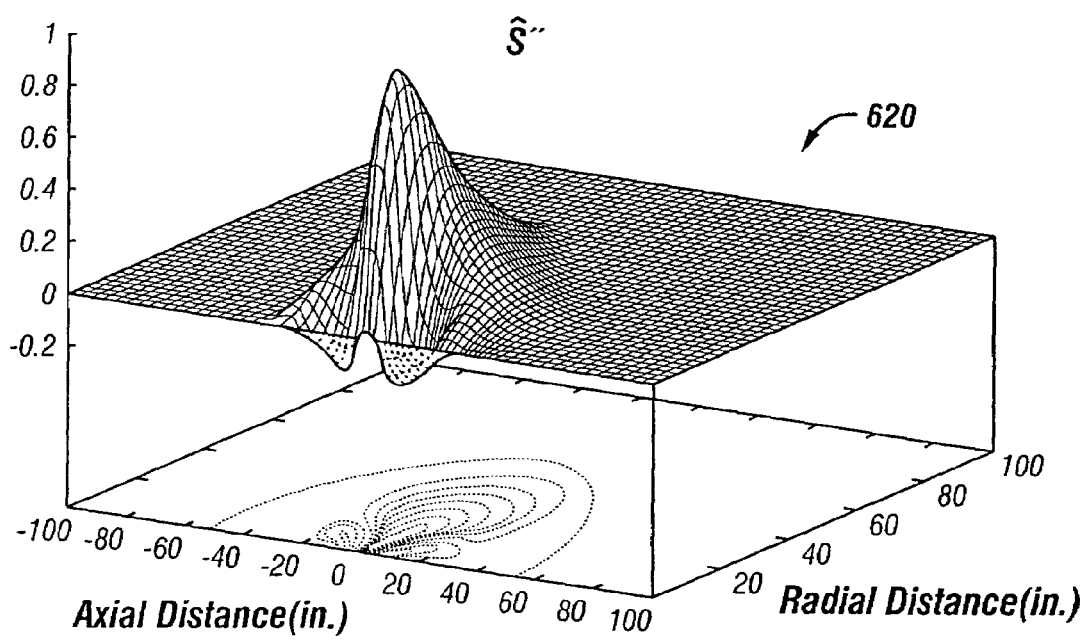

Turning now to FIGS. 6a and 6b, illustrated are plots of the sensitivity functions $\hat{S}'$ and $\hat{S}''$ derived from $S'$ and $S''$ for the medium transmitter-receiver spacing measurement shown in FIGS. 5a and 5c using the transformation $$\hat{S} = \frac{S}{I[S]}.$$

Figure 6C:
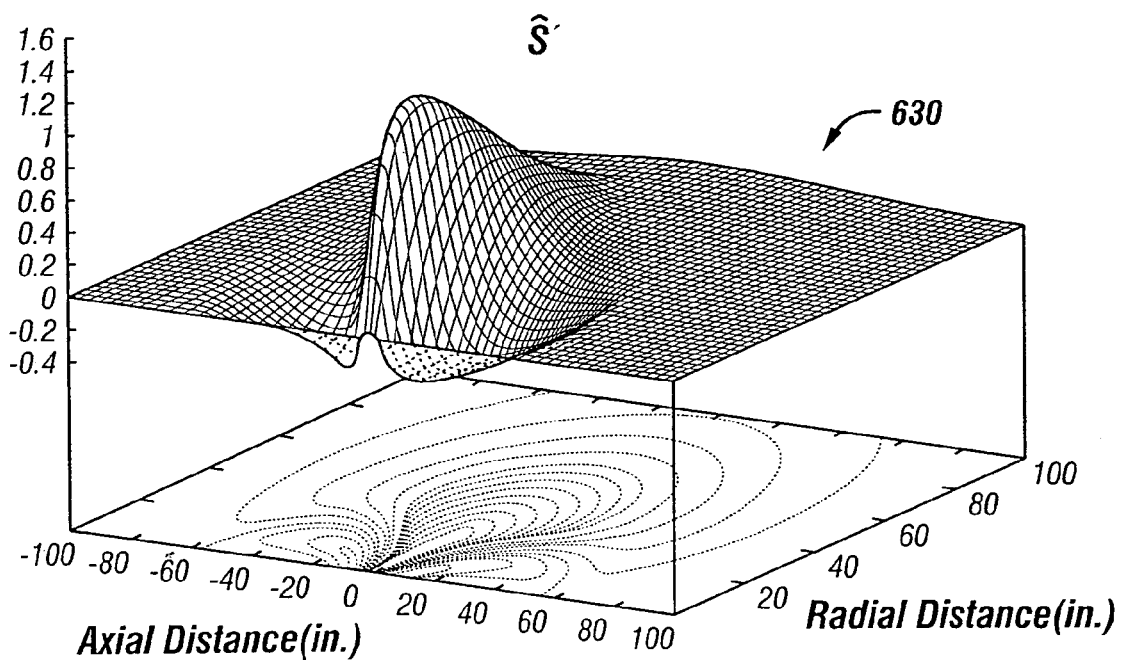
Figure 6D:
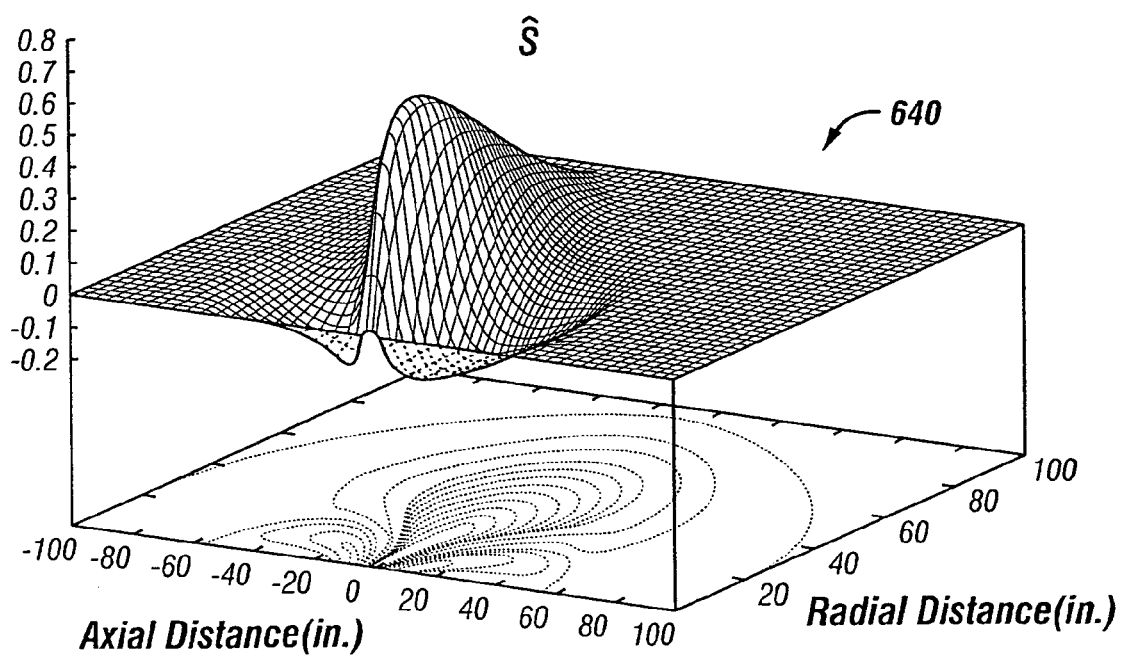

The data in FIGS. 6c and 6d were derived from the data in FIGS. 5b and 5d for the Deep T-R spacing measurement. As shown in FIGS. 6a, 6b, 6c and 6d, using the transformed measurements to determine the electrical parameters of the earth formation is a substantial improvement over the prior art. The estimates of the medium parameters are more accurate and less susceptible to errors in the estimate of the background medium because the calculation of the resistivity is relatively unaffected by the dielectric constant and the calculation of the dielectric constant is relatively unaffected by the resistivity. In addition to integrating to 0, the peak values for $\hat{S}''$ in FIGS. 6b and 6d are significantly less than the respective peak values for $\hat{S}'$ in FIGS. 6a and 6c. Both of these properties are very desirable because $\hat{S}''$ is the sensitivity function for the variable that is suppressed.

Realization of the Transformation

In order to realize the transformation, it is desirable to have values of I[S] readily accessible over the range of background medium parameters that will be encountered. One way to achieve this is to compute the values for I[S] and then store them in a lookup table for use later. Of course, it is not necessary to store these data in such a lookup table if it is practical to quickly calculate the values for I[S] on command when they are needed. In general, the values for I[S] can be computed by directly; however, it can be shown that $$I[S] = \frac{1}{w_0} \frac{\partial w}{\partial \tilde{\sigma}} \bigg|_{\tilde{\sigma}=\sigma_0}$$

where $w_0$ is the expected value for the measurement in the background medium, and the indicated derivative is calculated using the following definition:

$$\frac{\partial w}{\partial \tilde{\sigma}} \bigg|_{\tilde{\sigma}=\sigma_0} = \lim_{\Delta\tilde{\sigma}\to 0} \frac{w(\tilde{\sigma}_0 + \Delta\tilde{\sigma}) - w(\tilde{\sigma}_0)}{(\tilde{\sigma}_0 + \Delta\tilde{\sigma}) - \tilde{\sigma}_0}.$$

In the above formula, $\tilde{\sigma}_0$ may vary from point to point in the formation 215 (the background medium may be inhomogeneous), but the perturbation $\Delta\tilde{\sigma}$ is constant at all points in the formation 215. As an example of evaluating I[S] using the above formula, consider the idealized case of a homogeneous medium with a small transmitter coil and two receiver coils spaced a distance $L_1$ and $L_2$ from the transmitter. Then, $$w_0 = \left(\frac{L_1}{L_2}\right)^3 \frac{\exp(ik_0 L_2)(1 - ik_0 L_2)}{\exp(ik_0 L_1)(1 - ik_0 L_1)}$$

$$I[S] = \frac{1}{w_0} \frac{\partial w}{\partial \tilde{\sigma}}\bigg|_{\tilde{\sigma}=\sigma_0} = \frac{i\omega\mu}{2}\left(\frac{(L_2)^2}{1 - ik_0 L_2} - \frac{(L_1)^2}{1 - ik_0 L_1}\right)$$

The wave number in the background medium is $k_0 = \sqrt{i\omega\mu\sigma_0}$, the function $\exp(\cdot)$ is the complex exponential function where $\exp(1) \approx 2.71828$, and the symbol $\mu$ denotes the magnetic permeability of the earth formation. The above formula for I[S] applies to both uncompensated (FIG. 3) and to compensated (FIG. 4) measurements because the background medium has reflection symmetry about the center of the antenna array in FIG. 4.

For the purpose of this example, the above formula is used to compute the values for I[S]=I[S']+iI[S"]. FIG. 7 illustrates an exemplary table 701 employed in a Create Lookup Table step 903 (FIG. 9) of the technique of the disclosed embodiment. Step 903 generates a table such as table 701 including values for the integral of the sensitivity function over the range of variables of interest. The first two columns of the table 701 represent the conductivity $\sigma_0$ and the dielectric constant $\in_0$ of the background medium. The third and fourth columns of the table 701 represent calculated values for the functions I[S'] and I[S"] for a Deep measurement, in which the spacing between the transmitter 305 receivers 307 and 309 is 50 and 60 inches, respectively. The fifth and sixth columns of the table 701 represent calculated values for the functions I[S'] and I[S"] for a Medium measurement, in which the spacing between the transmitter 305 receivers 307 and 309 is 20 and 30 inches, respectively. It is understood that both the frequency of the transmitter(s) and the spacing between the transmitter(s) and receiver(s) can be varied. Based upon this disclosure, it is readily apparent to those skilled in the art that algorithms such as the one described above can be applied to alternative measurement configurations. If more complicated background media are used, for example including the mandrel with finite-diameter antennas, it may be more practical to form a large lookup table such as table 701 but with many more values. Instead of calculating I[S] every time a value is needed, data would be interpolated from the table. Nonetheless, table 701 clearly illustrates the nature of such a lookup table. Such a table would contain the values of the functions I[S'] and I[S"] for the entire range of values of the conductivity $\sigma_0$ and the dielectric constant $\in_0$ likely to be encountered in typical earth formations. For example, I[S'] and I[S"] could be calculated for values of $\in_0$ between 1 and 1000 and for values of $\sigma_0$ between 0.0001 and 10.0. Whether calculating values for the entire lookup table 701 or computing the I[S'] and I[S"] on command as needed, the data is used as explained below.

Figure 8:
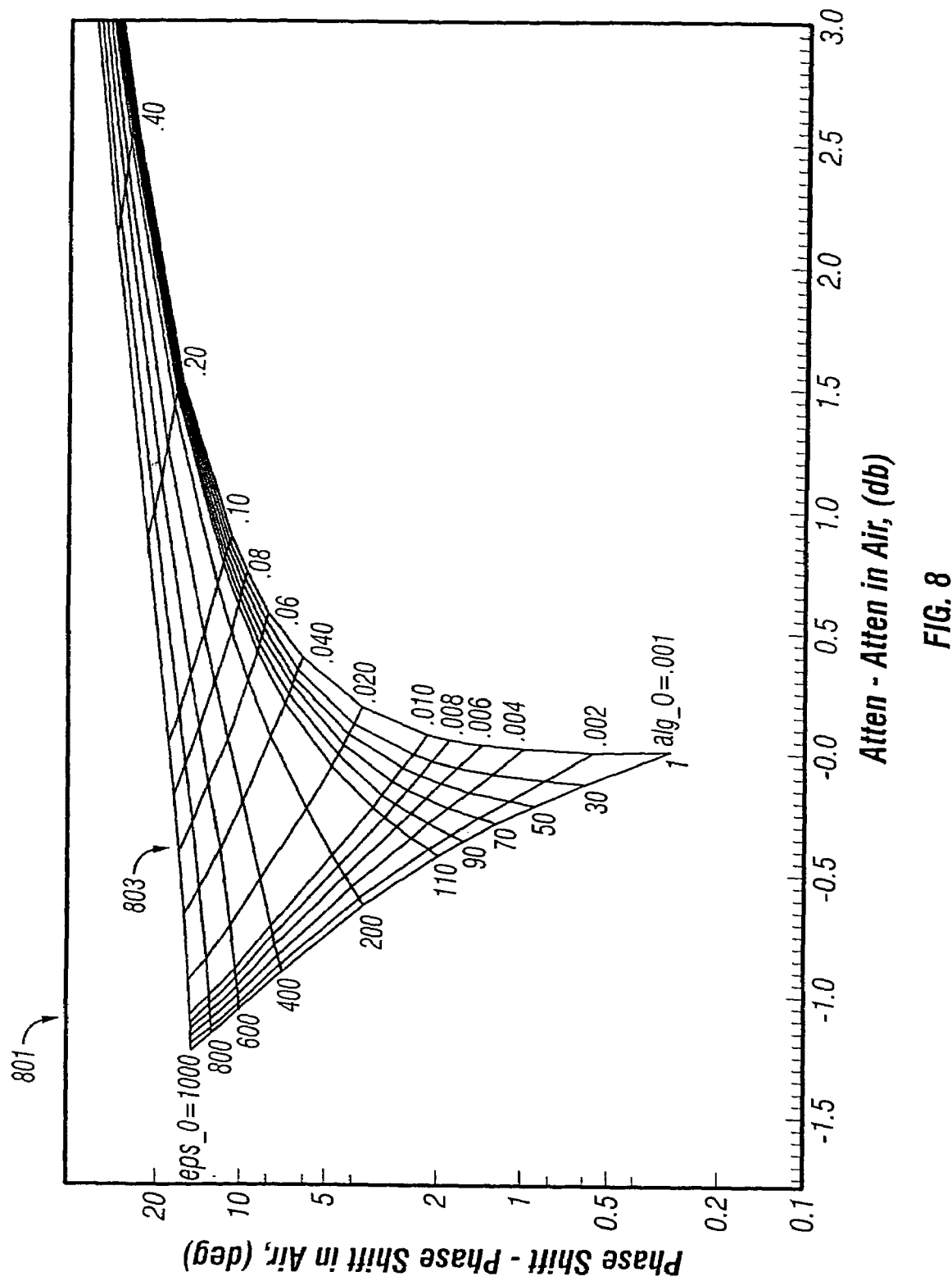
FIG. 8 is a plot of attenuation and phase as a function of resistivity and dielectric constant.

FIG. 8 illustrates a chart 801 used to implement a Determine Background Medium Parameters step 905 (FIG. 9) of the techniques of the disclosed embodiment. The chart 801 represents a plot of the attenuation and phase shift as a function of resistivity and dielectric constant in a homogeneous medium. Similar plots can be derived for more complicated media. However, the homogeneous background media are routinely used due to their simplicity. Well known numerical methods such as inverse interpolation can be used to calculate an initial estimate of background parameters based upon the chart 801. In one embodiment, the measured attenuation and phase shift values are averaged over a few feet of depth within the borehole 201. These average values are used to determine the background resistivity and dielectric constant based upon the chart 801. It should be understood that background medium parameters can be estimated in a variety of ways using one or more attenuation and phase measurements.

Figure 9:
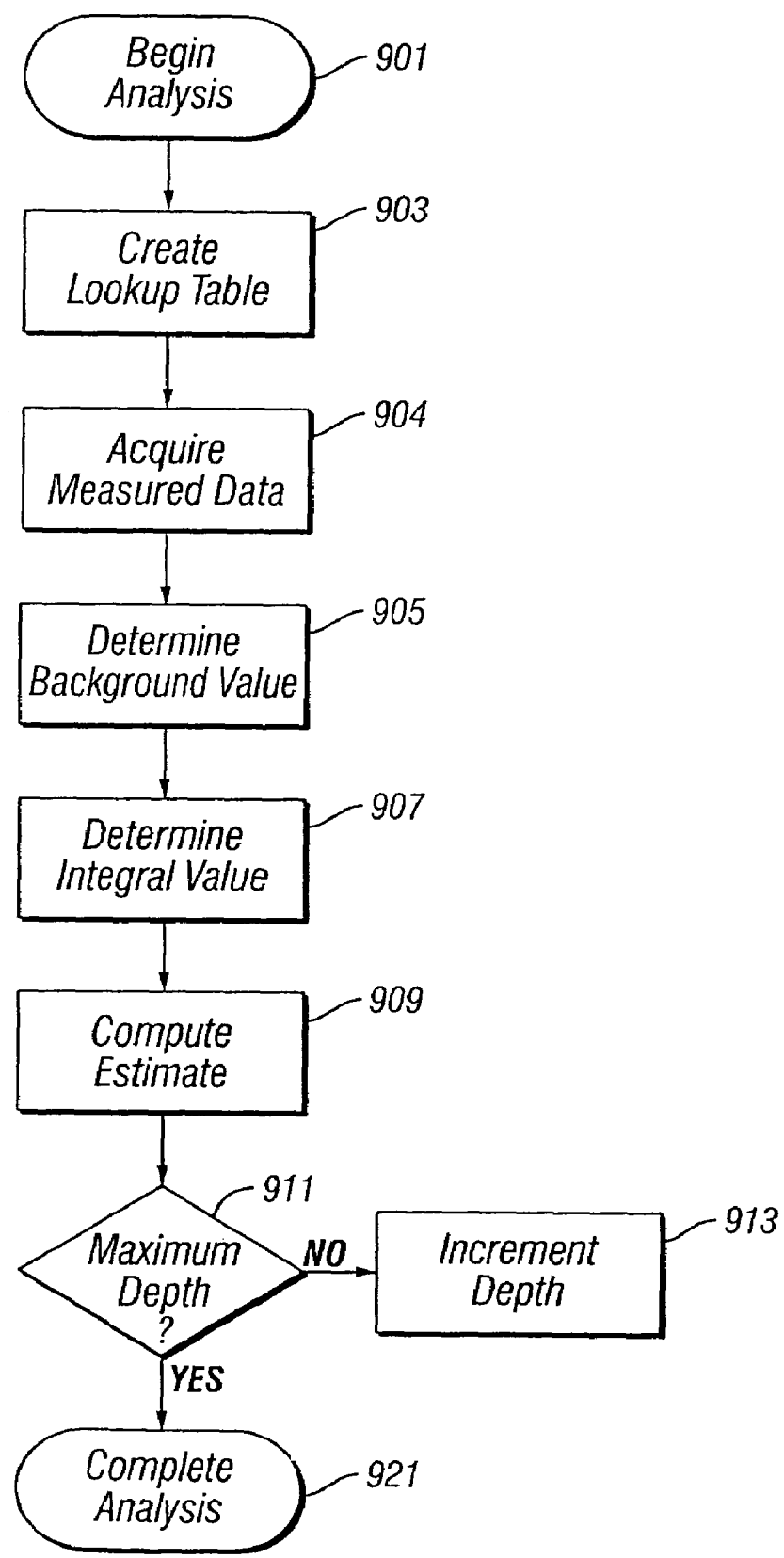
FIG. 9 is a flowchart of a process that implements the techniques of a disclosed embodiment.

FIG. 9 is a flowchart of an embodiment of the disclosed transformation techniques that can be implemented in a software program which is executed by a processor of a computing system such as a computer at the surface or a "downhole" microprocessor. Starting in a Begin Analysis step 901, control proceeds immediately to the Create Lookup Table step 903 described above in conjunction with FIG. 7. In an alternative embodiment, step 903 can be bypassed and the function of the lookup table replaced by curve matching, or "forward modeling." Control then proceeds to an Acquire Measured Data Step 904. Next, control proceeds to a Determine Background Values Step 905, in which the background values for the background medium are determined. Step 905 corresponds to the chart 801 (FIG. 8).

Control then proceeds to a Determine Integral Value step 907. The Determine Integral Value step 907 of the disclosed embodiment determines an appropriate value for I[S] using the lookup table generated in the step 903 described above or by directly calculating the I[S] value as described in conjunction with FIG. 7. Compute Parameter Estimate, step 909, computes an estimate for the conductivity and dielectric constant as described above using the following equation:

$$\Delta \hat{\sigma} = \frac{I[S\Delta \tilde{\sigma}]}{I[S]} = I[\hat{S}\Delta \tilde{\sigma}] = \frac{1}{I[S]}\left(\frac{cw_1 - w_{bh}}{w_0} - 1\right).$$

where the borehole effect and a calibration factor are taken into account using the factors $w_{bh}$ and c, respectively. The conductivity value plotted on the log (this is the value correlated to the conductivity of the actual earth formation) is $\mathrm{Re}(\Delta\hat{\sigma}+\tilde{\sigma}_0)$ where the background medium is characterized by $\tilde{\sigma}_0$. The estimate for the dielectric constant can also be plotted on the log (this value is correlated to the dielectric constant of the earth formation), and this value is $\mathrm{Im}(\Delta\hat{\sigma}+\tilde{\sigma}_0)/\omega$. Lastly, in the Final Depth step 911, it is determined whether the tool 201 is at the final depth within the earth formation 215 that will be considered in the current logging pass. If the answer is "Yes," then control proceeds to a step 921 where is processing is complete. If the answer in step 911 is "No," control proceeds to a Increment Depth step 913 where the tool 220 is moved to its next position in the borehole 201 which penetrates the earth formation 215. After incrementing the depth of the tool 220, control proceeds to step 904 where the process of steps 904, 905, 907, 909 and 911 are repeated. It should be understood by those skilled in the art that embodiments described herein in the form a computing system or as a programmed electrical circuit can be realized.

Improved estimates for the conductivity and/or dielectric constant can be determined by simultaneously considering multiple measurements at multiple depths. This procedure is described in more detail below under the heading "Multiple Sensors At Multiple Depths."

Multiple Sensors at Multiple Depths

In the embodiments described above, the simplifying assumption that $\Delta\tilde{\sigma}$ is not position dependent facilitates determining a value for $\Delta\tilde{\sigma}$ associated with each measurement by considering only that measurement at a single depth within the well (at least given a background value $\tilde{\sigma}_0$). It is possible to eliminate the assumption that $\Delta\tilde{\sigma}$ is independent of position by considering data at multiple depths, and in general, to also consider multiple measurements at each depth. An embodiment of such a technique for jointly transforming data from multiple MWD/LWD sensors at multiple depths is given below. Such an embodiment can also be used for processing data from a wireline dielectric tool or a wireline induction tool. Alternate embodiments can be developed based on the teachings of this disclosure by those skilled in the art.

In the disclosed example, the background medium is not assumed to be the same at all depths within the processing window. In cases where it is possible to assume the background medium is the same at all depths within the processing window, the system of equations to be solved is in the form of a convolution. The solution to such systems of equations can be expressed as a weighted sum of the measurements, and the weights can be determined using standard numerical methods. Such means are known to those skilled in the art, and are referred to as "deconvolution" techniques. It will be readily understood by those with skill in the art that deconvolution techniques can be practiced in conjunction with the disclosed embodiments without departing from the spirit of the invention, but that the attendant assumptions are not necessary to practice the disclosed embodiments in general.

Devices operating at multiple frequencies are considered below, but multifrequency operation is not necessary to practice the disclosed embodiments. Due to frequency dispersion (i.e., frequency dependence of the dielectric constant and/or the conductivity value), it is not necessarily preferable to operate using multiple frequencies. Given the disclosed embodiments, it is actually possible to determine the dielectric constant and resistivity from single-frequency data. In fact, the disclosed embodiments can be used to determine and quantify dispersion by separately processing data sets acquired at different frequencies. In the below discussion, it is understood that subsets of data from a given measurement apparatus or even from several apparatuses can be processed independently to determine parameters of interest. The below disclosed embodiment is based on using all the data available strictly for purpose of simplifying the discussion.

Suppose multiple transmitter-receiver spacings are used and that each transmitter is excited using one or more frequencies. Further, suppose data are collected at multiple depths in the earth formation 215. Let N denote the number of independent measurements performed at each of several depths, where a measurement is defined as the data acquired at a particular frequency from a particular set of transmitters and receivers as shown in FIGS. 3 or 4. Then, at each depth $z_k$, a vector of all the measurements can be defined as $$\bar{v}_k = \left[\left(\frac{w_1}{w_0} - 1\right)_{k1}, \left(\frac{w_1}{w_0} - 1\right)_{k2}, \ldots, \left(\frac{w_1}{w_0} - 1\right)_{kN}\right]^T,$$

and the perturbation of the medium parameters from the background medium values associated with these measurements is $$\Delta\tilde{\bar{\sigma}} = \Delta\tilde{\sigma}(\rho,z)[1,1,\ldots,1]^T$$

in which the superscript T denotes a matrix transpose, $\bar{v}_k$ is a vector each element of which is a measurement, and $\Delta\tilde{\bar{\sigma}}$ is a vector each element of which is a perturbation from the background medium associated with a corresponding element of $\bar{v}_k$ at the point P 225. In the above, the dependence of the perturbation, $\Delta\tilde{\sigma}(\rho, z)$ on the position of the point P 225 is explicitly denoted by the variables $\rho$ and z. In general, the conductivity and dielectric constant of both the background medium and the perturbed medium depend on $\rho$ and z; consequently, no subscript k needs to be associated with $\Delta\tilde{\sigma}(\rho, z)$, and all elements of the vector $\Delta\tilde{\bar{\sigma}}$ are equal. As described above, borehole corrections and a calibration can be applied to each measurement, but here they are omitted for simplicity.

The vectors $\bar{v}_k$ and $\Delta\tilde{\bar{\sigma}}$ are related as follows:

$$\bar{v}_k = I[\bar{S}\Delta\tilde{\bar{\sigma}}]$$

in which $\bar{S}$ is a diagonal matrix with each diagonal element being the sensitivity function centered on the depth $z_k$, for the corresponding element of $\bar{v}_k$, and the integral operator I is defined by:

$$I[F] = \int_{-\infty}^{+\infty} dz \int_0^{+\infty} d\rho F(\rho, z).$$

Using the notation $$I_{mn}[F] = \int_{z_{m-1}}^{z_m} dz \int_{\rho_{n-1}}^{\rho_n} d\rho F(\rho, z)$$

to denote integrals of a function over the indicated limits of integration, it is apparent that $$\bar{v}_k = \sum_{m=-M}^{+M} \sum_{n=1}^{N'} I_{mn}[\bar{S}\Delta\tilde{\sigma}]$$

if $\rho_0=0$, $\rho_{N'}=+\infty$, $z_{-M-1}=-\infty$, and $z_M=+\infty$. The equation directly above is an integral equation from which an estimate of $\Delta\tilde{\sigma}(\rho,z)$ can be calculated. With the definitions $\rho_n^*=(\rho_n+\rho_{n-1})/2$ and $z_m^*=(z_m+z_{m-1})/2$ and making the approximation $\Delta\tilde{\sigma}(\rho, z)=\Delta\hat{\sigma}(\rho_n^*, z_m^*)$ within the volumes associated with each value for m and n, it follows that $$\bar{v}_k = \sum_{m=-M}^{+M} \sum_{n=1}^{N'} I_{mn}[\bar{S}]\Delta\hat{\sigma}(\rho_n^*, z_m^*)$$

where $N' \leq N$ to ensure this system of equations is not underdetermined. The unknown values $\Delta\hat{\sigma}(\rho_n^*, z_m^*)$ can then be determined by solving the above set of linear equations. It is apparent that the embodiment described in the section entitled "REALIZATION OF THE TRANSFORMATION" is a special case of the above for which M=0, N=N'=1.

Although the approximation $\Delta\tilde{\sigma}(\rho, z)=\Delta\hat{\sigma}(\rho_n^*, z_m^*)$ (which merely states that $\Delta\tilde{\sigma}(\rho, z)$ is a piecewise constant function of $\rho$, z) is used in the immediately above embodiment, such an approximation is not necessary. More generally, it is possible to expand $\Delta\tilde{\sigma}(\rho, z)$ using a set of basis functions, and to then solve the ensuing set of equations for the coefficients of the expansion. Specifically, suppose $$\Delta\tilde{\sigma}(\rho, z) = \sum_{m=-\infty}^{\infty} \sum_{n=-\infty}^{\infty} a_{mn}\phi_{mn}(\rho, z)$$

then, $$\bar{v}_k = \sum_{m=-\infty}^{\infty} \sum_{n=-\infty}^{\infty} I[\bar{S}\phi_{mn}]\bar{a}_{mn}$$

where $\bar{a}_{mn}=a_{mn}[1,1,\ldots,1]^T$. Some desirable properties for the basis functions $\phi_{mn}$ are: 1) the integrals $I[\bar{S}\phi_{mn}]$ in the above equation all exist; and, 2) the system of equations for the coefficients $\alpha_{mn}$ is not singular. It is helpful to select the basis functions so that a minimal number of terms is needed to form an accurate approximation to $\Delta\tilde{\sigma}(\rho, z)$.

The above embodiment is a special case for which the basis functions are unit step functions. In fact, employing the expansion $$\Delta\tilde{\sigma}(\rho, z) =$$

$$\sum_{m=-M}^{+M} \sum_{n=1}^{N'} \Delta\hat{\sigma}(\rho_n^*, z_m^*)[u(z-z_m)-u(z-z_{m-1})][u(\rho-\rho_n)-u(\rho-\rho_{n-1})]$$

where $u(\cdot)$ denotes the unit step function leads directly to the same system of equations $$\bar{v}_k = \sum_{m=-M}^{+M} \sum_{n=1}^{N'} I_{mn}[\bar{S}]\Delta\hat{\sigma}(\rho_n^*, z_m^*)$$

given in the above embodiment. Specific values for M, N', $z_m$, and $\rho_n$ needed to realize this embodiment of the invention depend on the excitation frequency(ies), on the transmitter-receiver spacings that are under consideration, and generally on the background conductivity and dielectric constant. Different values for $z_m$ and $\rho_n$ are generally used for different depth intervals within the same well because the background medium parameters vary as a function of depth in the well.

Solving the immediately above system of equations results in estimates of the average conductivity and dielectric constant within the volume of the earth formation 215 corresponding to each integral $I_{mn}[\bar{S}]$. In an embodiment, the Least Mean Square method is used to determine values for $\Delta\hat{\sigma}(\rho_n^*, z_m^*)$ by solving the above system of equations. Many texts on linear algebra list other techniques that may also be used.

Unlike other procedures previously used for processing MWD/LWD data, the techniques of a disclosed embodiment account for dielectric effects and provide for radial inhomogeneities in addition to bedding interfaces by consistently treating the signal as a complex-valued function of the conductivity and the dielectric constant. This procedure produces estimates of one variable (i.e., the conductivity) are not corrupted by effects of the other (i.e., the dielectric constant).

A series of steps, similar to those of FIG. 9, can be employed in order to implement the embodiment for Multiple Sensors at Multiple Depths. Since the lookup table for $I_{mn}[\bar{S}]$ needed to realize such an embodiment could be extremely large, these values are evaluated as needed in this embodiment. This can be done in a manner analogous to the means described in the above section "REALIZATION OF THE TRANSFORMATION" using the following formulae:

$$I_{mn}[S] = \frac{1}{w_0} \frac{\partial w}{\partial \tilde{\sigma}_{mn}}\bigg|_{\tilde{\sigma}=\tilde{\sigma}_0}$$

$$\frac{\partial w}{\partial \tilde{\sigma}_{mn}}\bigg|_{\tilde{\sigma}=\tilde{\sigma}_0} = \lim_{\Delta\tilde{\sigma}_{mn} \to 0} \frac{w(\tilde{\sigma}_0+\Delta\tilde{\sigma}_{mn})-w(\tilde{\sigma}_0)}{(\tilde{\sigma}_0+\Delta\tilde{\sigma}_{mn})-\tilde{\sigma}_0}.$$

where $\tilde{\sigma}_{mn}=\sigma_{mn}+i\omega\epsilon_{mn}$ represents the conductivity and dielectric constant of the region of space over which the integral $I_{mn}[S]$ is evaluated. In words, $I_{mn}[S]$ can be calculated by evaluating the derivative of the measurement with respect to the medium parameters within the volume covered by the integration. Alternatively, one could evaluate $I_{mn}[S]$ by directly carrying out the integration as needed. This eliminates the need to store the values in a lookup table.

While the above exemplary systems are described in the context of an MWD/LWD system, it shall be understood that a system according to the described techniques can be implemented in a variety of other logging systems such as wireline induction or wireline dielectric measurement systems. Further in accordance with the disclosed techniques, it should be understood that phase shift and attenuation can be combined in a variety of ways to produce a component sensitive to resistivity and relatively insensitive to dielectric constant and a component sensitive to dielectric constant and relatively insensitive to resistivity. In the instance of MWD/LWD resistivity measurement systems, resistivity is the variable of primary interest; as a result, phase shift and attenuation measurements can be combined to produce a component sensitive to resistivity and relatively insensitive dielectric constant.

Single Measurements at a Single Depth

One useful embodiment is to correlate (or alternatively equate) a single measured value $w_1$ to a model that predicts the value of the measurement as a function of the conductivity and dielectric constant within a prescribed region of the earth formation. The value for the dielectric constant and conductivity that provides an acceptable correlation (or alternatively solves the equation) is then used as the final result (i.e., correlated to the parameters of the earth formation). This procedure can be performed mathematically, or graphically. Plotting a point on a chart such as FIG. 8 and then determining which dielectric value and conductivity correspond to it is an example of performing the procedure graphically. It can be concluded from the preceding sections, that $\hat{S}$ is the sensitivity of such an estimate of the dielectric constant and conductivity to perturbations in either variable. Thus such a procedure results in an estimate for the conductivity that has no net sensitivity to the changes in the dielectric constant and an estimate for the dielectric constant that has no net sensitivity to changes in the conductivity within the volume in question. This is a very desirable property for the results to have. The utility of employing a single measurement at a single depth derives from the fact that data processing algorithms using minimal data as inputs tend to provide results quickly and reliably. This procedure is a novel means of determining one parameter (either the conductivity or the dielectric constant) with no net sensitivity to the other parameter. Under the old assumptions, this procedure would appear to not be useful for determining independent parameter estimates.

Iterative Forward Modeling and Dipping Beds

The analysis presented above has been carried out assuming a 2-dimensional geometry where the volume P 225 in FIG. 2 is a solid of revolution about the axis of the tool. In MWD/LWD and wireline operations, there are many applications where such a 2-dimensional geometry is inappropriate. For example, the axis of the tool often intersects boundaries between different geological strata at an oblique angle. Practitioners refer to the angle between the tool axis and a vector normal to the strata as the relative dip angle. When the relative dip angle is not zero, the problem is no longer 2-dimensional. However, the conclusion that: 1) the attenuation measurement is sensitive to the conductivity in the same volume as the phase measurement is sensitive to the dielectric constant; and, 2) an attenuation measurement is sensitive to the dielectric constant in the same volume that the phase measurement is sensitive to the conductivity remains true in the more complicated geometry. Mathematically, this conclusion follows from the Cauchy-Reimann equations which still apply in the more complicated geometry (see the section entitled "SENSITIVITY FUNCTIONS"). The physical basis for this conclusion is that the conduction currents are in quadrature (90 degrees out of phase) with the displacement currents. At any point in the formation, the conduction currents are proportional to the conductivity and the displacement currents are proportional to the dielectric constant.

A common technique for interpreting MWD/LWD and wireline data in environments with complicated geometry such as dipping beds is to employ a model which computes estimates for the measurements as a function of the parameters of a hypothetical earth formation. Once model input parameters have been selected that result in a reasonable correlation between the measured data and the model data over a given depth interval, the model input parameters are then correlated to the actual formation parameters. This process is often referred to as "iterative forward modeling" or as "Curve Matching," and applying it in conjunction with the old assumptions, leads to errors because the volumes in which each measurement senses each variable have to be known in order to adjust the model parameters appropriately.

The algorithms discussed in the previous sections can also be adapted for application to data acquired at non-zero relative dip angles. Selecting the background medium to be a sequence of layers having the appropriate relative dip angle is one method for so doing.

Transformations for a Resistivity-Dependent Dielectric Constant

In the embodiments described above, both the dielectric constant and conductivity are treated as independent quantities and the intent is to estimate one parameter with minimal sensitivity to the other. As shown in FIG. 1, there is empirical evidence that the dielectric constant and the conductivity can be correlated. Such empirical relationships are widely used in MWD/LWD applications, and when they hold, one parameter can be estimated if the other parameter is known.

This patent application shows that: 1) an attenuation measurement is sensitive to the conductivity in the same volume of an earth formation as the phase measurement is sensitive to the dielectric constant; and, 2) the attenuation measurement is sensitive to the dielectric constant in the same volume that the phase measurement is sensitive to the conductivity. A consequence of these relationships is that it is not generally possible to derive independent estimates of the conductivity from a phase and an attenuation measurement even if the dielectric constant is assumed to vary in a prescribed manner as a function of the conductivity. The phrase "not generally possible" is used above because independent estimates from each measurement can be still be made if the dielectric constant doesn't depend on the conductivity or if the conductivity and dielectric constant of earth formation are practically the same at all points within the sensitive volumes of both measurements. Such conditions represent special cases which are not representative of conditions typically observed within earth formations.

Even though two independent estimates of the conductivity are not generally possible from a single phase and a single attenuation measurement, it is still possible to derive two estimates of the conductivity from a phase and an attenuation measurement given a transformation to convert the dielectric constant into a variable that depends on the resistivity. For simplicity, consider a device such as that of FIG. 3. Let the complex number $w_1$ denote an actual measurement (i.e., the ratio of the voltage at receiver 307 relative to the voltage at receiver 309, both voltages induced by current flowing through transmitter 305). Let the complex number w denote the value of said measurement predicted by a model of the tool 320 in a prescribed earth formation 315. For further simplicity, suppose the model is as described above in the section "REALIZATION OF THE TRANSFORMATION." Then, $$w \equiv w(\sigma, \varepsilon(\sigma)) = \left(\frac{L_1}{L_2}\right)^3 \frac{\exp(ikL_2)(1 - ikL_2)}{\exp(ikL_1)(1 - ikL_1)}$$

where the wave number $k \equiv k(\sigma, \in(\sigma)) = \sqrt{i\omega\mu(\sigma + i\omega \in(\sigma))}$, and the dependence of the dielectric constant $\in$ on the conductivity $\sigma$ is accounted for by the function $\in(\sigma)$. Different functions $\in(\sigma)$ can be selected for different types of rock. Let $\sigma_P$ and $\sigma_A$ denote two estimates of the conductivity based on a phase and an attenuation measurement and a model such as the above model. The estimates can be determined by solving the system of equations $$0 = |w_1| - |w(\sigma_A, \in(\sigma_P))|$$

$$0 = \text{phase}(w_1) - \text{phase}(w(\sigma_P, \in(\sigma_A))).$$

The first equation involves the magnitude (a.k.a. the attenuation) of the measurement and the second equation involves the phase (a.k.a. the phase shift) of the measurement. Note that the dielectric constant of one equation is evaluated using the conductivity of the other equation. This disclosed technique does not make use of the "old assumptions." Instead, the attenuation conductivity is evaluated using a dielectric value consistent with the phase conductivity and the phase conductivity is evaluated using a dielectric constant consistent with the attenuation conductivity. These conductivity estimates are not independent because the equations immediately above are coupled (i.e., both variables appear in both equations). The above described techniques represent a substantial improvement in estimating two resistivity values from a phase and an attenuation measurement given a priori information about the dependence of the dielectric constant on the conductivity. It can be shown that the sensitivity functions for the conductivity estimates $\sigma_A$ and $\sigma_P$ are S' and S", respectively if the perturbation to the volume P 225 is consistent with the assumed dependence of the dielectric constant on the conductivity and $\sigma_A = \sigma_P$.

It will be evident to those skilled in the art that a more complicated model can be used in place of the simplifying assumptions. Such a model may include finite antennas, metal or insulating mandrels, formation inhomogeneities and the like. In addition, other systems of equations could be defined such as ones involving the real and imaginary parts of the measurements and model values. As in previous sections of this disclosure, calibration factors and borehole corrections may be applied to the raw data.

Transformations for a Resistivity-Dependent Dielectric Constant Used in Conjunction with Conventional Phase Resistivity Values The preceding section, "TRANSFORMATIONS FOR A RESISTIVITY-DEPENDENT DIELECTRIC CONSTANT," provides equations for $\sigma_P$ and $\sigma_A$ that do not make use of the "old assumptions." One complication that results from using said equations is that both a phase shift measurement and an attenuation measurement must be available in order to evaluate either $\sigma_P$ or $\sigma_A$. In MWD/LWD applications, both phase shift and attenuation measurements are commonly recorded; however, the attenuation measurements are often not telemetered to the surface while drilling. Since bandwidth in the telemetry system associated with the logging tool is limited, situations arise where it is useful to have less precise resistivity measurements in favor of other data such as density, speed of sound or directional data. The following reparameterization of the system of equations in the previous section accommodates this additional consideration:

$$0 = |w_1| - |w(\sigma_A, \in(\sigma_P))|$$

$$0 = \text{phase}(w_1) - \text{phase}(w(\sigma_P, \in(\sigma_P))),$$

where $\sigma_P$ and $\sigma_A$ respectively represent the reciprocals of the first and second resistivity values; the second equation involves a phase of the measured electrical signal and the first equation involves a magnitude of the measured electrical signal at a given frequency of excitation; a function $\in(\cdot)$ represents a correlation between the dielectric constant and the resistivity and is evaluated in $\sigma_P$ in the first and second equations; $w_1$ represents an actual measurement (e.g., the ratio of the voltage at receiver 307 relative to the voltage at receiver 309, both voltages induced by current flowing through transmitter 305) in the form of a complex number, and a function $w(\sigma, \in)$ represents a mathematical model which estimates $w_1$. More particularly, $\in(\sigma_P)$ represents the transformation of dielectric constant into a variable that depends upon resistivity.

The second equation evaluates phase conductivity $\sigma_P$ and the dielectric constant correlation with the same phase conductivity which is consistent with sensing both resistivity and dielectric constant in substantially the same volume. The first equation evaluates attenuation conductivity $\sigma_A$ and the dielectric constant correlation with the phase conductivity (not an attenuation conductivity) which is consistent with sensing the resistivity and dielectric constant in different volumes. The second equation allows $\sigma_P$ to be determined by a phase shift measurement alone. The first equation is actually the same equation as in the previous section, but the value of $\sigma_A$ that solves the equation may not be the same as in the previous section because the value of $\sigma_P$ used in the correlation between the dielectric constant and the resistivity may not be the same. In other words, the phase conductivity $\sigma_P$ can be determined without the attenuation measurement, but the attenuation conductivity $\sigma_A$ is a function of both attenuation and phase shift measurements. The value of $\sigma_P$ resulting from these equations is the conventional phase conductivity cited in the prior art which is derived using the "old assumptions" that the phase shift measurement senses both the resistivity and dielectric constant within substantially the same volume. The value for $\sigma_A$ is consistent with the fact the attenuation measurement senses the resistivity in substantially the same volume that the phase measurement senses the dielectric constant; however, the $\sigma_A$ value is a better approximation than the $\sigma_A$ values in the previous section because the phase conductivity $\sigma_P$ used to evaluate the correlation between the dielectric constant and the resistivity is derived using the "old assumptions." The above two equations are partially coupled in that the phase conductivity $\sigma_P$ is needed from the second equation to determine the attenuation conductivity $\sigma_A$ in the first equation.

Since the phase shift measurement is typically less sensitive to the dielectric constant than the corresponding attenuation measurement, the equations given in this section for $\sigma_P$ and $\sigma_A$ provide a reasonable tradeoff between the following: 1) accurate resistivity measurement results, 2) consistent resistivity measurement results (reporting the same resistivity values from both recorded and telemetered data), and 3) minimizing amounts of telemetered data while drilling.

When the perturbation to the volume P 225 is consistent with the assumed dependence of the dielectric constant on the conductivity, the sensitivity functions for conductivity estimates $\sigma_P$ and $\sigma_A$ determined by the equations given in this section are:

$$\Delta\sigma_P = \frac{S''\omega\frac{d\varepsilon}{d\sigma}S'}{I[S''] - \omega\frac{d\varepsilon}{d\sigma}I[S']}\Delta\sigma\Delta\rho\Delta z$$

$$\Delta\sigma_A = \left[\frac{S'}{I[S']} + \frac{\left(\omega\frac{d\varepsilon}{d\sigma}\right)^2(S'I[S''] - S''I[S'])}{I[S']\left(I[S''] - \omega\frac{d\varepsilon}{d\sigma}I[S']\right)}\right]\Delta\sigma\Delta\rho\Delta z$$

where $$\frac{d\varepsilon}{d\sigma}$$

represents the derivative of function $\in(\sigma)$, and it was assumed for simplicity that $\sigma_A = \sigma_P$. The sensitivity function for $\sigma_P$ is the coefficient of $\Delta\sigma\Delta\rho\Delta z$ in the first equation, and the sensitivity function for $\sigma_A$ is the coefficient of $\Delta\sigma\Delta\rho\Delta z$ in the second equation. Note that the leading term S'' in the sensitivity function of the first equation and the leading term $$\frac{S'}{I[S']}$$

in the sensitivity function of the second equation are approximately the sensitivity function mentioned in the section, "TRANSFORMATIONS FOR A RESISTIVITY-DEPENDENT DIELECTRIC CONSTANT," and that the remaining terms are representative of the sensitivity error resulting from using the equations given in this section. In the second equation, the error term in the sensitivity for $\sigma_A$ tends to be small because it is proportional to $$\left(\omega\frac{d\varepsilon}{d\sigma}\right)^2.$$

It can be shown that the error term for the sensitivity function of a $\sigma_A$ estimate resulting from equations consistent with the old assumptions is proportional to $$\left(\omega\frac{d\varepsilon}{d\sigma}\right)$$

and is thus a larger error than produced by the technique described in this section. As a result, the technique of this section represents a substantial improvement over the prior art.

Approximations to Facilitate Use of Rapidly-Evaluated Models

Many of the techniques described in the previous sections are even more useful if they can be applied in conjunction with a simplified model of the measurement device. This is especially true for embodiments which use iterative numerical techniques to solve systems of nonlinear equations because the amount of computer time required to achieve a solution is reduced if details of the measurement device can be ignored. Such details include finite sized antennas 205, 207 and a metallic drill collar 203. Models that do not include such details can often be evaluated rapidly in terms of algebraic functions whereas models including these details may require a numerical integration or other similar numerical operations. An alternative choice for solving such systems of equations is to store multidimensional lookup tables and perform inverse interpolation. An advantage of using the lookup tables is that the model calculations are done in advance; so, results can be determined quickly once the table has been generated. However, 1) a large amount of memory may be required to store the lookup table; 2) it may be difficult to handle inputs that are outside the range of the table; 3) the tables may require regeneration if the equipment is modified, and 4) the tables themselves may be costly to generate and maintain.

The approach taken here is a compromise. One-dimensional lookup tables are used to renormalize each measurement so as to be approximately consistent with data from a simplified measurement device which has infinitesimal antennas and no metallic mandrel. The renormalized data are used in conjunction with a simpler, but more rapidly evaluated model to determine the conductivity and/or dielectric constant estimates. Higher dimensional lookup tables could be used to account for more variables, but this has proved unnecessary in practice.

Suppose the function $h_0(\sigma, \in)$ represents a model that estimates the measurements as a function of the conductivity and dielectric constant which includes details of the tool that are to be normalized away (i.e. finite antennas and a metallic mandrel). Suppose $h_1(\sigma, \in)$ is a simplified model which is a function of the same formation parameters (i.e. the resistivity and the dielectric constant) but that assumes infinitesimal antennas and no metallic mandrel. The data shown in FIG. 10 are for the medium spaced 2 MHz measurement described in conjunction with FIG. 7. The first two columns of data resistivity (1/sigma) and dielectric constant (eps_rel) values are input into the respective models (which are not used in the algorithm, but are shown to illustrate how the table is generated). It was found that when the resistivity and dielectric constant are not both large, satisfactory results can be achieved by calculating the data as a function of the conductivity for only one dielectric constant, and in this embodiment, a relative dielectric constant of 35 was used. The third column (db_pt) contains the attenuation values for the simplified model evaluated as a function of conductivity, and the fourth column (db_man) contains the attenuation values for the model which explicitly accounts for the finite sized antennas and metallic mandrel. The fifth (deg_pt) and sixth (deg_man) columns are similar to the third and fourth columns but for the phase shift instead of the attenuation. All data are calibrated to read zero if the electrical parameters of the surrounding medium are that of a vacuum (i.e., the air) ($\sigma=0, \in=1$). Specifically, columns 3 and 4 are:

$$g'_a = db\_pt = 20 \log 10(|h_1(\sigma, \in)/h_1(0,1)|)$$

$$g_a = db\_man = 20 \log 10(|h_0(\sigma, \in)/h_0(0,1)|)$$

Columns 5 and 6 are:

$$g'_p = \deg\_pt = \frac{180}{\pi}\arg(h_1(\sigma, \varepsilon)/h_1(0,1))$$

$$g_p = \deg\_man = \frac{180}{\pi}\arg(h_0(\sigma, \varepsilon)/h_0(0,1)).$$

In practice, calibrated measurements are used as values for db_man or phs_man (i.e. the ordinates in the one-dimensional interpolation). The corresponding values for db_pt or phs_pt result from the interpolation. Once the values for db_pt or phs_pt have been determined, relatively simple models such as $$h_1 = \left(\frac{L_1}{L_2}\right)^3 \frac{\exp(ik_0 L_2)(1 - ik_0 L_2)}{\exp(ik_0 L_1)(1 - ik_0 L_1)}$$

can be parameterized as described in the several preceding sections and used to solve numerically for the desired parameters. The solutions can be obtained quickly, using robust and well known numerical means such as the non-linear least squares technique.

An alternative procedure would be to transform the values from the relatively simple model, to corresponding db_man and deg_man values. This would produce equivalent results, but in conjunction with an iterative solution method, is clumsy because it requires the values from the simple model to be converted to db_man and deg_man values at each step in the iteration.

Extended Approximations to Facilitate Use of Rapidly-Evaluated Models

The embodiment described in above section, "APPROXIMATIONS TO FACILITATE USE OF RAPIDLY-EVALUATED MODELS," looses accuracy when the resistivity and dielectric constant are simultaneously large enough to cause the attenuation value to be less than its "air-hang" value. This region corresponds to values in FIG. 8 with negative values on the horizontal axis. Embodiments of an extended technique addressing this shortcoming are described below. This extension is based on the observation that the difference between the mandrel and point-dipole values depends more strongly on the dielectric constant than the resistivity when the resistivity is large.

Figure 12:
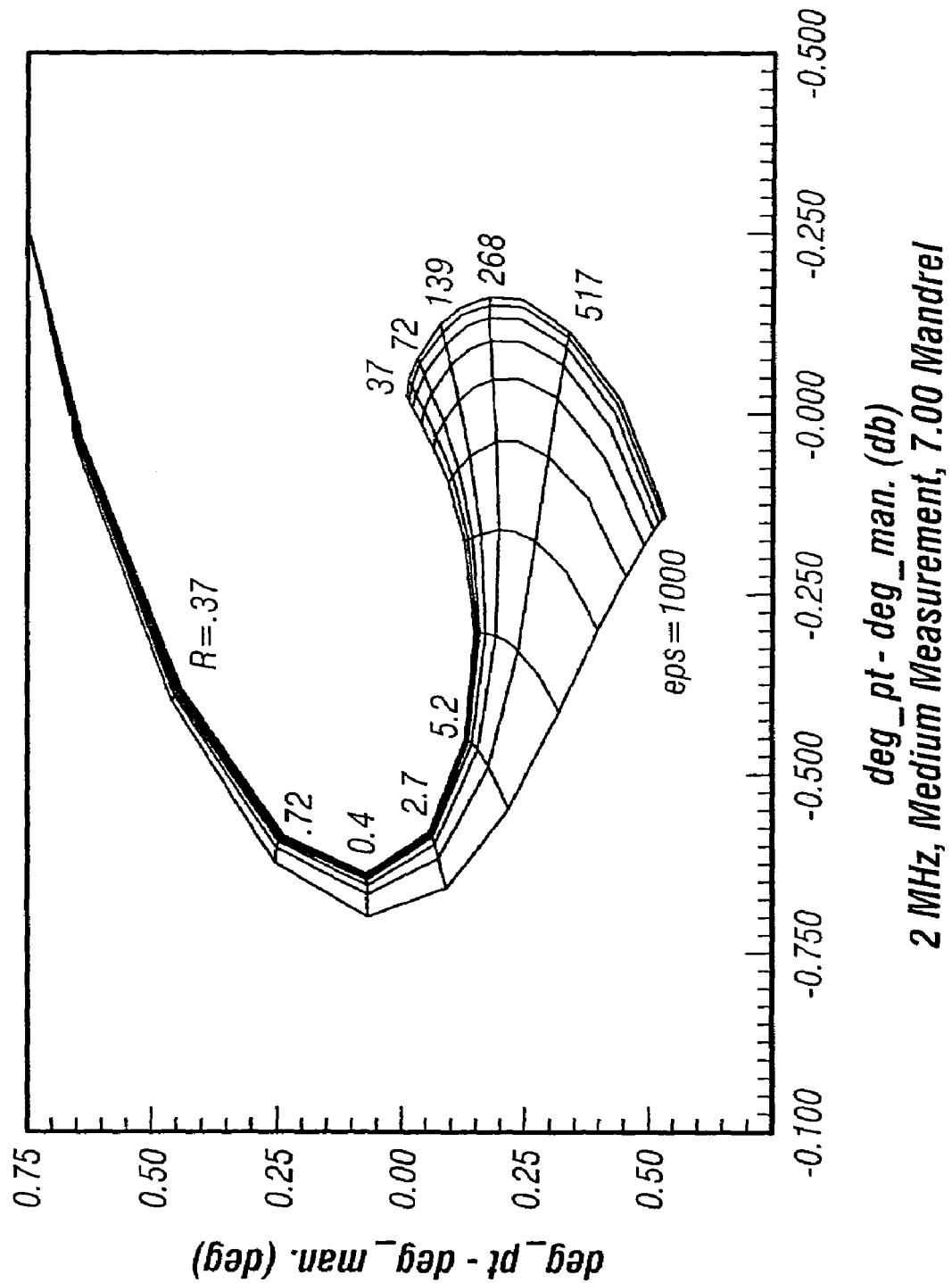
FIG. 12 is a plot showing the difference between measured (mandrel) and point-dipole values as a function of both the resistivity and dielectric constant for the medium spaced 2 MHz measurement.

When the attenuation and phase shift measurements are consistent with simultaneous large resistivity and dielectric constant values, the data in FIG. 11 are used (instead of the data in FIG. 10) to transform the measured values (deg_man, db_man) to the corresponding point-dipole values (deg_pt, db_pt). FIG. 12 is a plot of the difference between the point-dipole and mandrel values as a function of both the resistivity and dielectric constant. Two regimes are evident: 1) for low resistivity, the difference between the point-dipole and mandrel data depends more strongly on the resistivity than on the dielectric constant; and, 2) for high resistivity, the difference between the point-dipole and mandrel data depends more strongly on the dielectric constant than on the resistivity.

In order to facilitate use of these extended approximations without operator intervention, point-dipole values consistent with both FIGS. 10 and 11 are computed. They are combined to form a weighted sum that biases the result heavily toward consistency with FIG. 11 when appropriate and heavily toward consistency with FIG. 10 when appropriate. Specifically, for the disclosed embodiment two terms are used in the weighted sum, $$g'_a = c_{1a} f_{1a}(g_a) + c_{2a} f_{2a}(g_a)$$

$$g'_p = c_{1p} f_{1p}(g_p) + c_{2p} f_{2p}(g_p)$$

where $g'_a$ and $g'_p$ represent the point-dipole values, $g_a$ and $g_p$ represent the measured (mandrel) values as defined under the heading, "APPROXIMATIONS TO FACILITATE USE OF RAPIDLY-EVALUATED MODELS." The functions $f_{1a}$ and $f_{1p}$, defined numerically from data such as that of FIG. 10, give corresponding point-dipole value as a function of the measured value for a first set of resistivity and dielectric constant values. The functions $f_{2a}$ and $f_{2p}$, defined numerically from data such as that of FIG. 11, give corresponding point-dipole value as a function of the measured value for a second set of resistivity and dielectric constant values. The coefficients $c_{1a}$, $c_{2a}$, $c_{1p}$, and $c_{2p}$ are chosen to produce values for $g'_a$ and $g'_p$ that approximate point-dipole values over the anticipated range of $g_a$ and $g_p$. Satisfactory performance of the algorithm has been obtained with $$c = c_{1a} = c_{1p} = 1 - c_{2a} = 1 - c_{2p}$$

$$= \frac{u(g_a - g_{a0}) + \exp(-\alpha|g_a - g_{a0}|)u(g_{a0} - g_a)}{1 + \exp(-\alpha|g_a - g_{a0}|)}$$

where $$u(x) = \begin{cases} 0, & x < 0 \\ 0.5, & x = 0 \\ 1 & x > 0 \end{cases}$$

$\alpha = 5 \times 10^{-5} f$, f is the frequency in Hz and $$g_{a0} = \beta \ln(g_p) + \gamma$$

For each spacing and frequency the parameters $\beta$ and $\gamma$ can be determined empirically. For the medium 2 MHz measurement discussed above, $\beta = -0.047$ dB and $\gamma = -0.159$ dB are satisfactory.

Figure 13:
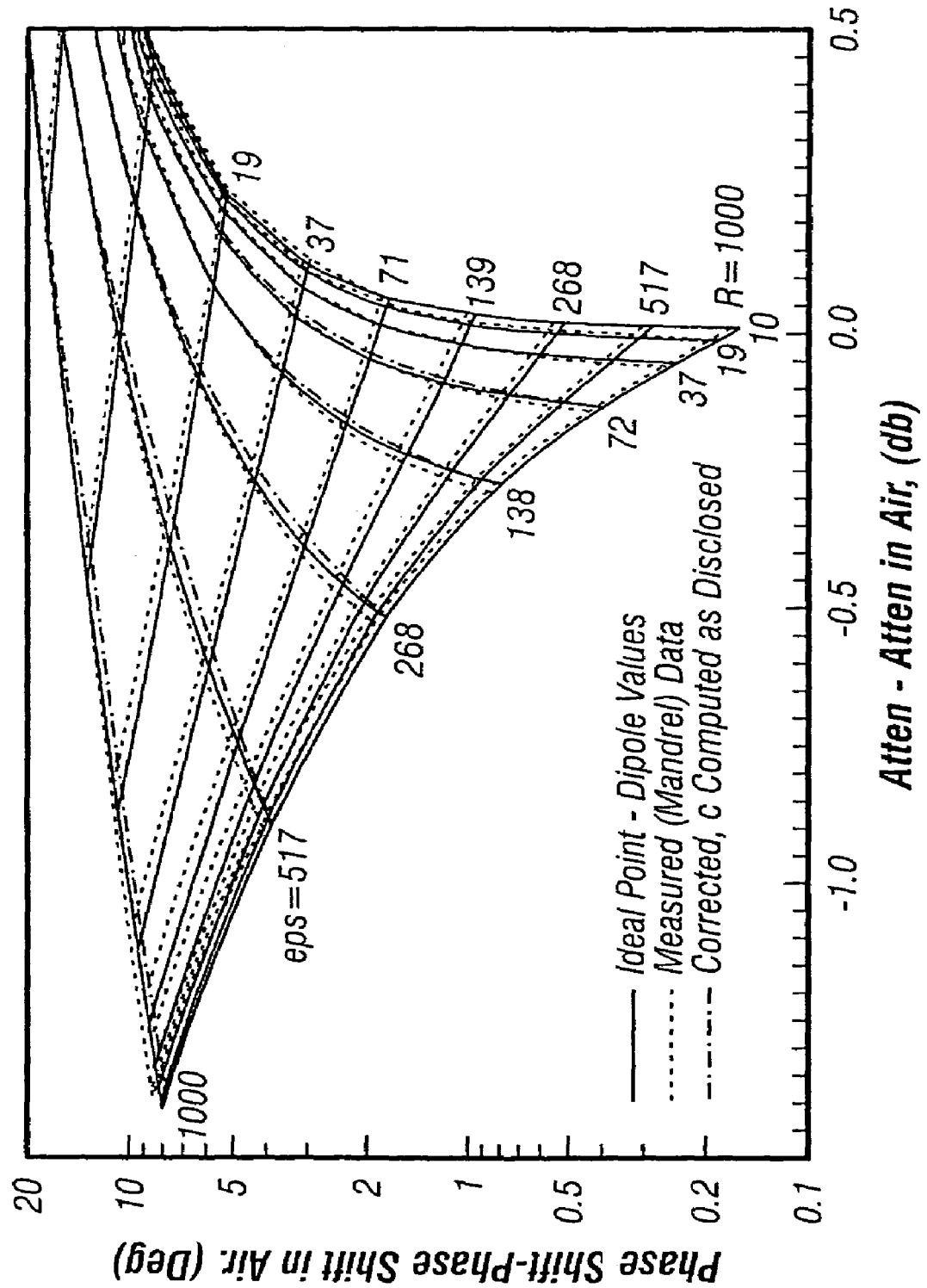
FIG. 13 is a plot showing the performance of the extended approximations that facilitate use of rapidly-evaluated models.

FIG. 13 shows the results of applying this embodiment to the medium 2 MHz data. The dotted lines represent the measured (mandrel) data $g_a$ and $g_p$. The dot-dash lines represent the corrected data $g'_a$ and $g'_p$. Ideally, the corrected data would coincide exactly with the actual point-dipole values which the solid lines represent. The difference between such ideal results and the results achieved using this embodiment are not significant for most practical applications.

It will be clear to those skilled in the art that further improvements in accuracy can be achieved if necessary. One way would be to use independent values for the coefficients $c_{1a}$ $c_{2a}$, $c_{1p}$, and $c_{2p}$. Another alternative would be to add more terms to the weighted sums. If N terms are used, $$g'_a = \sum_{i=1}^{N} c_{ia} f_{ia}(g_a)$$

$$g'_p = \sum_{i=1}^{N} c_{ip} f_{ip}(g_p)$$

where $f_{ia}$ and $f_{ip}$ represent the transformation between the mandrel and point-dipole data over prescribed trajectories in the $g_a$, $g_p$ plane. The embodiments described above in detail employs one trajectory determined by constant values of resistivity as in FIG. 10 and another trajectory determined by constant dielectric constant values as in FIG. 11. However, trajectories where neither variable is constant are also acceptable.

Mathematical Formulation for Iterative Forward Modeling Using the Full Parameter Space In the above section entitled, "ITERATIVE FORWARD MODELING AND DIPPING BEDS," dielectric constant and resistivity values are simultaneously determined using procedures known as "iterative forward modeling" or "curve matching." Those of ordinary skill in the art are generally familiar with a mathematical formulation for these procedures. A formulation is given here in order to define some notation that will be used in the next section. For simplicity, the electrical properties will be treated as piecewise constant functions of space. Consistent with the above text, the conductivity and dielectric values are treated as real-valued variables. This simplifying assumption results in dielectric losses being associated with the corresponding conductivity and in the association of conduction currents in quadrature with the electric field with the corresponding dielectric constant.

Let the vector $$\overline{w}_1 = \overline{w}_1' + i\overline{w}_1'' = [w_{11}, \ldots, w_{1N}]^T$$

denote a set of measured data where the superscript T denotes the matrix transpose. Each component of the vector $\overline{w}_1$ is a complex number that represents a voltage ratio defined as explained in the descriptions of FIGS. 3 and 4. For convenience, it will be assumed that the number of measurements N=JK is the product of: 1) the number of depth values K being considered, and 2) the number of measurements J available at each depth. Suppose a model is available to estimate $\overline{w}_1$ as a function of the vectors $$\overline{\sigma} = [\sigma_1, \ldots, \sigma_L]^T$$

$$\overline{\in} = [\in_1, \ldots, \in_L]^T$$

and $$\overline{b} = [b_1, \ldots, b_M]^T$$

Each value $\sigma_i$ and $\in_i$ respectively represents a conductivity value and dielectric constant value within a prescribed region of space. Each value $b_i$ represents a spatial coordinate of a boundary separating two or more regions. Specific values of each vector $\overline{\sigma}$, $\overline{\in}$, and $\overline{b}$ to be correlated with the parameters of the earth formation denoted by $\overline{\sigma}^*$, $\overline{\in}^*$, and $\overline{b}^*$ can be determined by solving the equation $$\overline{w}_1 = \overline{F}(\overline{\sigma}^*, \overline{\in}^*, \overline{b}^*)$$

where $\overline{F}$ represents a model used to estimate the measurement vector as a function of the vectors $\overline{\sigma}$, $\overline{\in}$, and $\overline{b}$. The model $\overline{F}$ is itself a transformation (or function) that maps the vectors $\overline{\sigma}$, $\overline{\in}$, and $\overline{b}$ to a vector representative of the measurement. It is desirable for the Jacobian matrix of the transformation $\overline{F}$ to have a sufficient number of singular values within a domain near the point $\overline{\sigma}^*$, $\overline{\in}^*$, and $\overline{b}^*$ in order to ensure the problem is not underdetermined. Many published numerical techniques for obtaining approximate solutions when a system of equations is fully, over, or under determined are known to those skilled in the art. Those of ordinary skill in the art are generally familiar with mathematical derivation and numerical implementation of mathematical models suitable for use as the vector function $\overline{F}$.

In some instances, it may be helpful to apply transformations to the measured and model data, and then solve the transformed system of equations. The formula $\overline{G}(\overline{w}_1) = \overline{H}(\overline{F}(\overline{\sigma}^*, \overline{\in}^*, \overline{b}^*))$ represents such transformed equations. The system of equations $\overline{w}_1 = \overline{F}(\overline{\sigma}^*, \overline{\in}^*, \overline{b}^*)$ is just the special case where the transformations $\overline{G}$ and $\overline{H}$ applied respectively to the measured and model data are both identity transformations. Examples where transformations other than the identity transformation are applied to the measured and model data are discussed below under the headings, "MATHEMATICAL FORMULATION FOR ITERATIVE FORWARD MODELING USING A REDUCED PARAMETER SPACE," and "USE OF PHASE AND/OR ATTENUATION RESISTIVITY DATA."

Mathematical Formulation for Iterative Forward Modeling Using a Reduced Parameter Space In the previous section, the conductivity values are solved for along with the corresponding dielectric constants. Solving the system of equations $$\overline{w}_1 = \overline{F}(\overline{\sigma}^*, \overline{\in}^*, \overline{b}^*)$$

may involve repeated evaluation of the Jacobian matrix for the transformation $\overline{F}$ which will be denoted by $\overline{J}(\overline{F})$. This matrix contains the derivative of $\overline{F}$ with respect to each variable. After each evaluation, a singular value decomposition may be performed on $\overline{J}(\overline{F})$. Evaluating and manipulating this matrix can be numerically intensive and time consuming. Use of the Cauchy-Reimann equations to relate derivatives of $F_i$ with respect to $\sigma_j$ and $\in_j$ helps reduce the cost of evaluating $\overline{J}(\overline{F})$, but does not reduce the dimensionality of this N×(2L+M) complex-valued matrix where N represents the number of measurements, L represents the number of conductivity and dielectric constant values and M represents the number of spatial coordinates being treated as variables.

In many applications, the conductivity is the value of primary interest; consequently, the disclosed embodiment is a technique of determining values for $\overline{\sigma}^*$ and $\overline{b}^*$ without also determining $\overline{\in}^*$, providing numerical efficiency. It should be evident that analogous procedures could be applied to estimate $\overline{\in}^*$ and $\overline{b}^*$ without also determining $\overline{\sigma}^*$. The steps of the disclosed embodiment are as follows:

1. Apply a first transformation to the measured data such that the result, $\overline{\sigma}_0$, is relatively sensitive to the conductivity and relatively insensitive to the dielectric constant: $\overline{\sigma}_0 = \text{Re}(\overline{F}_0^{-1}(\overline{w}_1))$.
2. Transform the unknown dielectric constant vector $\overline{\in}$ which $\overline{F}$ depends on to a vector that is a function of the corresponding (but also unknown) conductivity vector $\overline{\sigma}$. In other words, $\overline{\in} \rightarrow \overline{\in}(\overline{\sigma}) = [\in_1(\sigma_1), \ldots, \in_L(\sigma_L)]^T$. For convenience, a given dielectric value $\in_i$ is assumed to be a function only of the corresponding conductivity value $\sigma_i$. Alternatively, some or all of the dielectric values could be assumed to be: 1) constants, independent of the conductivity; or 2) functions of any or all of the conductivity values associated with the vector $\overline{\sigma}$.
3. Evaluate the model $\overline{F}(\overline{\sigma}, \overline{\in}(\overline{\sigma}), \overline{b})$
4. Apply the transformation in step 1 to $\overline{F}(\overline{\sigma}, \overline{\in}(\overline{\sigma}), \overline{b})$
5. Identify values for $\overline{\sigma}$ and $\overline{b}$ that cause the results of Steps 1 and 4 to agree, and correlate these values with $\overline{\sigma}^*$ and $\overline{b}^*$.

A suitable choice for the transformation mentioned Step 1 is to use conductivity values determined as described above in "SINGLE MEASUREMENTS AT A SINGLE DEPTH," and described in more detail in, S. M. Haugland, "New Discovery with Important Implications for LWD Propagation Resistivity Processing and Interpretation," SPWLA 42nd Annual Logging Symposium, paper LL, Jun. 17–20, 2001. In the embodiment disclosed here, Step 1 is realized by fitting each measurement (each component of the measurement vector $\overline{w}_1$), to a model of the measurement apparatus in a homogeneous medium and associating the conductivity of this medium with the result of the transformation. In terms of the above notation, $$\overline{w}_1 = \overline{F}_0(\overline{I}\overline{\sigma}_0 + i\overline{\Omega}\overline{\in}_0)$$

where the N×N matrix $\overline{\Omega}$ is diagonal with each nonzero element being equal to the radian frequency of excitation of the corresponding measurement; $\overline{I}$ is the identity matrix; $\overline{F}_0$ is the model of the measurement apparatus in the hypothetical homogeneous medium; the vector of length N, $\overline{\sigma}_0$, is the result of Step 1; and the vector of length N, $\overline{\in}_0$, is the dielectric constant vector associated with $\overline{\sigma}_0$. No vector $\overline{b}$ was associated with $\overline{F}_0$ because the medium is assumed to be homogeneous (however, an inhomogeneous background medium could be assumed without departing from the scope or spirit of this invention). In this embodiment, the system of equations $\overline{w}_1 = \overline{F}_0(\overline{I}\overline{\sigma}_0 + i\overline{\Omega}\overline{\in}_0)$ is uncoupled and can be expressed in scalar notation as follows:

$$w_{1p} = F_{0p}(\sigma_{0p} + i\omega_p \in_{0p}); \; p = 1, \ldots, N$$

The remaining steps are achieved by solving the system of equations:

$$Re(\overline{F}_0^{-1}(\overline{F}(\overline{\sigma}^*, \overline{\in}(\overline{\sigma}^*), \overline{b}^*))) = \overline{\sigma}_0$$

where Re(·) represents the real part of its argument. The inverse function $\overline{F}_0^{-1}$ has the properties: $\overline{w}_1 = \overline{F}_0(\overline{F}_0^{-1}(\overline{w}_1))$ and $\overline{\sigma}_0 + i\overline{\Omega}\overline{\in}_0 = \overline{F}_0^{-1}(\overline{F}_0(\overline{I}\overline{\sigma}_0 + i\overline{\Omega}\overline{\in}_0))$. Realizations of the inverse function $\overline{F}_0^{-1}$ applied to the model $\overline{F}$ and measured data $\overline{w}_1$ may be slightly different in order to account for differences between the measurement tool used to collect the measured data and the properties of the measurement tool assumed in the model. Alternatively, the model $\overline{F}$ may be defined so as to directly account for these differences.

Invasion Example

Instances where borehole fluids penetrate (invade) into the formation over time after drilling occur commonly. In some cases, the data acquired during the actual drilling process reflect invasion. In other cases, resistivity measurements from MAD (measurement after drilling) passes may reflect invasion even if the data acquired during drilling (the LWD data) did not. Invaded zones are often modeled by a piston-like cylinder surrounding the wellbore. Realizations of the vectors $\overline{\sigma}$, $\overline{\in}$, and $\overline{b}$ to characterize the invaded region of the formation are: $\overline{\sigma} = [\sigma_{xo}, \sigma_t]^T$, $\overline{\in} = [\in_{xo}, \in_t]^T$, and $\overline{b} = [r_i]^T$ where the subscripts xo and t respectively denote values associated with the invaded zone and virgin formation, and the radius of the invaded zone is $r_i$.

Given a set of measured data, one could solve directly for the two conductivity values, the two dielectric constants, and the invaded zone radius using the above mathematical formulation for iterative forward modeling using the full parameter space.

In the above mathematical formulation for iterative forward modeling using a reduced parameter space, the measured data are transformed to an apparent conductivity vector $\overline{\sigma}_0$. The reduced sensitivity of $\overline{\sigma}_0$ to the dielectric constant is a motive transforming the unknown dielectric constant vector to a function of the unknown conductivity values: $\overline{\in} \rightarrow \overline{\in}(\overline{\sigma}) = [\in_{xo}(\sigma_{xo}), \in_t(\sigma_t)]^T$. The remaining variables $\sigma_{xo}$, $\sigma_t$ and $r_i$ are then estimated by selecting values for $\overline{\sigma}$ and $\overline{b}$ such that computed estimates of the apparent conductivity values agree reasonably well with the apparent conductivity vector derived directly from the measurements.

Frequency Dispersion

The section entitled "MULTIPLE SENSORS AT MULTIPLE DEPTHS," mentions frequency dispersion is a complication that can arise if multiple excitation frequencies are used. One way to deal with frequency dispersion is to process data acquired using different excitation frequencies separately. For example, if several excitation frequencies are used, then distinct measurement vectors would be formed for each excitation frequency, and distinct realizations of the vectors $\overline{\sigma}^*$, $\overline{\in}^*$, and $\overline{b}^*$ would be computed for each excitation frequency. Separate processing of multi-frequency data can be done in either the full or reduced parameter spaces.

Over the frequency range of interest in wireline induction and LWD propagation resistivity logging applications, frequency dispersion is more commonly observed on the dielectric constant than the conductivity. As a result, the technique for estimating the conductivity values in the reduced parameter space is expected to be relatively insensitive to dielectric frequency dispersion even if multi-frequency data are simultaneously processed and no special measures are taken to account for (or suppress) dielectric dispersion effects. A variation of the embodiment disclosed above that is useful for further reducing the sensitivity of the results to dielectric frequency dispersion is to apply different realizations of function $\overline{\in}(\overline{\sigma})$ for each excitation frequency.

A variation of the above mathematical formulation for iterative forward modeling using the full parameter space that is useful to reduce the sensitivity of those results to dielectric frequency dispersion is to associate a different dielectric constant vector with each excitation frequency. Doing this results in the dielectric vector becoming the L×R matrix $$\overline{\overline{\varepsilon}} = \begin{bmatrix} \varepsilon_{11} & \cdots & \varepsilon_{1R} \\ \vdots & \ddots & \vdots \\ \varepsilon_{L1} & \cdots & \varepsilon_{LR} \end{bmatrix}$$

where R represents the number of excitation frequencies. The unknown conductivity vector could also be formulated in terms of a matrix to account for conductivity frequency dispersion. Such a matrix may be represented by:

$$\overline{\overline{\sigma}} = \begin{bmatrix} \sigma_{11} & \cdots & \sigma_{1R} \\ \vdots & \ddots & \vdots \\ \sigma_{L1} & \cdots & \sigma_{LR} \end{bmatrix}$$

In fact, mathematical formulation for iterative forward modeling using the full parameter spacing can be rewritten assuming frequency dispersion on both variables by defining the variables in terms of appropriate matrices. In that case, the equation $\overline{w}_1 = \overline{F}(\overline{\sigma}^*, \overline{\in}^*, \overline{b}^*)$ above becomes $$\overline{w}_1 = \overline{F}(\overline{\overline{\sigma}}^*, \overline{\overline{\in}}^*, \overline{b}^*)$$

and situations where frequency dispersion is not accounted for can be handled by augmenting this system of equations with constraints causing some or all of the columns of either matrix $\overline{\overline{\sigma}}^*$ or $\overline{\overline{\in}}^*$ to be equal. Such constraint equations can be written in the form $\sigma_{pq} = \sigma_{pr}$ or $\in_{pq} = \in_{pr}$. Defining unknown conductivity and dielectric matrices in the mathematical formulation for iterative modeling using a reduced parameter space to explicitly account for frequency dispersion results in the system of equations:

$$Re(\overline{F}_0^{-1}(\overline{F}(\overline{\overline{\sigma}}^*, \overline{\overline{\in}}(\overline{\overline{\sigma}}^*), \overline{b}^*))) = \overline{\sigma}_0$$

which can also be augmented by constraints of the form $\sigma_{pq} = \sigma_{pr}$. These techniques reduce sensitivity to frequency dispersion and allow one to simultaneously process measurements from different excitation frequencies in the presence of frequency dispersion.

Dropping the Piecewise Constant Electrical Parameter Assumption

Use of the vector $\bar{b}$ as defined in the mathematical formulation for iterative modeling using the full parameter space and thereafter is an assumption that the electrical parameters are piecewise constant functions of space within the earth formation. Such simplifying assumptions are commonly applied in the art for convenience, however, more faithful representations of spatial variations in the electrical properties are sometimes required. For example, an abrupt transition between the virgin formation and invaded zone is not anticipated by multiphase fluid flow models used to predict fluid profiles around the wellbore. Nonetheless, measured data are often fit to electromagnetic models which assume step boundaries between adjacent regions of the earth formation. The practice seems to be common because: 1) electromagnetic models which explicitly assume continuously varying (as a function of spatial variables) electrical parameters are not readily available; and 2) the spatial dependence of the resistivity and/or dielectric constant is typically not known a priori. It will be evident to those skilled in the art that such a simplifying assumption is optional.

Making a Dielectric Assumption without Applying a Transformation to the Measured Data In the mathematical formulation for iterative modeling using a reduced parameter space, the dielectric constants in the model $\bar{F}$ are assumed to be functions of the conductivities, and the remaining unknowns are estimated to give good agreement between the apparent conductivity values derived from the measured data and the apparent conductivity values derived from data calculated using the model $\bar{F}$. For a measurement vector $\bar{w}_1$ of length N, this method can be used to estimate no more than N conductivity values. Up to 2N conductivity estimates can be derived from the same measured data set if the apparent conductivity values are not used and the model is fit directly to the measurement vector. If the assumed dielectric function $\bar{\epsilon}(\bar{\sigma})$ is a sufficiently accurate representation of the actual dielectric properties fitting the model data directly to the measured data subject to the dielectric assumption will give accurate results. This embodiment consists of solving the system of equations $$\bar{w}_1 = \bar{F}(\bar{\sigma}^*, \bar{\epsilon}(\bar{\sigma}^*), \bar{b}^*)$$

where the constraint equations mentioned above under the heading "FREQUENCY DISPERSION" can be applied to the extent that frequency dispersion need not be accounted for.

Use of Phase and/or Attenuation Resistivity Data

Calculation of attenuation and phase resistivity values from individual measurements is discussed above under the headings, "TRANSFORMATIONS FOR A RESISTIVITY DEPENDENT DIELECTRIC CONSTANT," and "TRANSFORMATIONS FOR A RESISTIVITY DEPENDENT DIELECTRIC CONSTANT USED IN CONJUNCTION WITH CONVENTIONAL PHASE RESISTIVITY VALUES." Matching these resistivity values to similarly calculated resistivity values derived from model data is another embodiment that can be used. Suppose $A_{Op}$ denotes a transformation that converts the measured voltage ratio value $w_{1p}$ to a corresponding attenuation resistivity and $P_{Op}$ denotes a transformation that converts measured voltage ratio value $w_{1p}$ to the corresponding phase resistivity. Then, the real-valued vectors of length N, $\bar{P}_O(\bar{w}_1)$ and $\bar{A}_O(\bar{w}_1)$ are respectively the phase and attenuation resistivity values. It is then possible to set up systems of equations of the form $$\bar{P}_O(\bar{w}_1) = \bar{P}_O(\bar{F}(\bar{\sigma}^*, \bar{\epsilon}(\bar{\sigma}^*), \bar{b}^*))$$

and $$\bar{A}_O(\bar{w}_1) = \bar{A}_O(\bar{F}(\bar{\sigma}^*, \bar{\epsilon}(\bar{\sigma}^*), \bar{b}^*))$$

which can either be solved simultaneously or independently, depending on the situation. As discussed above, different versions of the transformations $\bar{P}_O$ and $\bar{A}_O$ can be used on the right and left hand sides of the above equations if differences between the actual measurement tool and the measurement tool assumed in the model have not been accounted for by other means. It should be understood that any of the equations presented herein may be implemented in a software program executed by a processor of a computing system such as a computer at the surface or a "downhole" microprocessor.

The disclosed techniques provide accurate conductivity estimates that are independent of dielectric constant properties. Conductivity values serve several applications such as (i) detecting the presence, absence or amount of a hydrocarbon, (ii) guiding a drill bit within a productive zone, (iii) estimating poor pressure, and (iv) evaluating reservoir and other geological features through correlation with logs and nearby wells. Two examples of applications for dielectric values are detecting the presence, absence or amount of a hydrocarbon and detecting vertical fractures.

The foregoing disclosure and description of the various embodiments are illustrative and explanatory thereof, and various changes in the descriptions, modeling, parameters and attributes of the system, the organization of the measurements, transmitter and receiver configurations, and the order and timing of steps taken, as well as in the details of the illustrated system may be made without departing from the spirit of the invention.

Although the present invention and its advantages have been described in detail, it should be understood that various changes, substitutions and alternations can be made herein without departing from the spirit and scope of the invention as defined by the appended claims.

I claim:

1. A method of estimating electrical parameters of an earth formation using a measuring device disposed to be deployed in a borehole, the measuring device disposed to collect formation data, the measuring device having a pre-established model associated therewith, the pre-established model governing the processing of the formation data to determine electrical parameters regarding the earth formation, the method comprising:
    (a) providing a simplified model associated with the measuring device, the simplified model making at least one simplifying assumption about the pre-established model;
    (b) receiving a set of collected formation data regarding the earth formation, the set of collected formation data collected by the measuring device;
    (c) normalizing the set of collected formation data to derive a renormalized dataset, wherein the renormalized dataset is substantially consistent with each of the simplifying assumptions in (a);
    (d) applying the renormalized dataset to the simplified model to estimate at least one electrical parameter of the earth formation; and (e) using the estimate of the at least one electrical parameter of the earth formation in a manner selected from the group consisting of detecting a hydrocarbon within the earth formation, guiding a drill bit within a productive zone of the earth formation, estimating poor pressure of the earth formation, evaluating geological features of the earth formation, and detecting vertical fractures within the earth formation.

2. The method of claim 1, wherein at least one of the electrical parameters estimated in (d) is selected from the group consisting of conductivity and dielectric constant.

3. The method of claim 1, in which the measurement device comprises a mandrel, and wherein at least one of the simplifying assumptions in (a) includes a simplified assumption with respect to the effect of the mandrel on the pre-established model.

4. The method of claim 1, in which the measurement device comprises a transmitter antenna of finite size, and wherein at least one of the simplifying assumptions in (a) includes an assumption regarding the size of an antenna in the simplified model.

5. The method of claim 4, wherein the assumption regarding the size of an antenna in the simplified model is that said antenna is infinitesimal.

6. The method of claim 1, wherein the measuring device collects formation data via analysis of an electric signal transmitted by the measuring device.

7. The method of claim 6, wherein the set of collected formation data includes data representing at least one characteristic of the electric signal selected from the group consisting of attenuation and phase shift.

8. The method of claim 1, wherein the set of collected formation data includes data that may be represented as a complex number.

9. The method of claim 1, wherein the renormalized dataset includes data that represent point-dipole values.

10. The method of claim 1, wherein (c) includes transforming the set of collected formation data into the renormalized dataset according to at least one member of the group consisting of:
(1) at least one predetermined equation;
(2) a predefined multi-dimensional look-up table; and
(3) a predefined one-dimensional look-up table.

11. The method of claim 1, wherein (c) includes transforming the set of collected formation data into the renormalized dataset according to weighted sums, the weighted sums comprising:

$$g'_a = \sum_{i=1}^{N} c_{ia} f_{ia}(g_a)$$

$$g'_p = \sum_{i=1}^{N} c_{ip} f_{ip}(g_p)$$

where $g_a$ and $g_p$ represent collected formation data, $g'_a$ and $g'_p$ represent corresponding members of the renormalized dataset, i=1 to N terms in the weighted sums, $f_{ia}$ and $f_{ip}$ are functions representing preselected transformations between mandrel and point-dipole data over prescribed trajectories in the $g_a$, $g_p$ plane, and $c_{ia}$ and $c_{ip}$ are coefficients chosen to produce values for $g'_a$ and $g'_p$ that approximate point-dipole values over an anticipated range of $g_a$ and $g_p$.

12. The method of claim 10, wherein the one-dimensional look-up table comprises:
a plurality of sets of table data, each set of table data matched to a corresponding one of a plurality of hypothetical earth formations, each set of table data further including a predicted measurement and a corresponding renormalized measurement that are each indicative of an electrical parameter of the corresponding hypothetical earth formation, wherein transformation from each predicted measurement to its corresponding renormalized measurement substantially reflects application of one of the simplifying assumptions to the predicted measurement.

13. The method of claim 12, wherein (c) in claim 1 further comprises deriving members of the renormalized dataset by interpolating members of the set of collected formation data between sets of table data in the one-dimensional look-up table.

14. The method of claim 12, wherein the one-dimensional look up table was previously generated by deriving each of the plurality of sets of table data for a single dielectric constant value and a series of corresponding resistivity values.

15. The method of claim 12, wherein the one-dimensional look up table was previously generated by deriving each of the plurality of sets of table data for a single resistivity value and a series of corresponding dielectric constant values.

16. The method of claim 12, wherein each of a predetermined subset of the plurality of hypothetical earth formations assumes a selected dielectric constant value and one of a plurality of different corresponding conductivity values.

17. The method of claim 12, wherein the plurality of hypothetical earth formations includes a vacuum.

18. The method of claim 1, wherein the simplified model includes a calibration factor to adjust for anomalies in the measurement device.

19. The method of claim 1, wherein the simplified model includes a component for adjusting for effects on the formation data caused by the borehole.

20. A processor-readable medium on which processor-executable logic may be stored, the processor-executable logic disposed to generate instructions to a computer processor, the instructions disposed to cause the computer processor to follow a method of estimating electrical parameters of an earth formation using a measuring device disposed to be deployed in a borehole, the measuring device disposed to collect formation data, the measuring device having a pre-established model associated therewith, the pre-established model governing the processing of the formation data to determine electrical parameters regarding the earth formation, method comprising:
(a) providing a simplified model associated with the measuring device, the simplified model making at least one simplifying assumption about the pre-established model;
(b) receiving a set of collected formation data regarding the earth formation, the set of collected formation data collected by the measuring device;
(c) normalizing the set of collected formation data to derive a renormalized dataset, wherein the renormalized dataset is substantially consistent with each of the simplifying assumptions in (a);
(d) applying the renormalized dataset to the simplified model to estimate at least one electrical parameter of the earth and formation; and
(e) using the estimate of the at least one electrical parameter of the earth formation in a manner selected from the group consisting of detecting a hydrocarbon within the earth formation, guiding a drill bit within a productive zone of the earth formation, estimating poor pressure of the earth formation, evaluating geological features of the earth formation, and detecting vertical fractures within the earth formation.

21. The processor-readable medium of claim 20, in which the measurement device comprises a mandrel, and wherein at least one of the simplifying assumptions in (a) includes a simplified assumption with respect to the effect of the mandrel on the pre-established model.

22. The processor-readable medium of claim 20, in which the measurement device comprises a transmitter antenna of finite size, and wherein at least one of the simplifying assumptions in (a) includes an assumption regarding the size of an antenna in the simplified model.

23. The processor-readable medium of claim 22, wherein the assumption regarding the size of an antenna in the simplified model is that said antenna is infinitesimal.

24. The processor-readable medium of claim 20, wherein the measuring device collects formation data via analysis of an electric signal transmitted by the measuring device.

25. The processor-readable medium of claim 20, wherein the renormalized dataset includes data that represent point-dipole values.

26. The method of claim 20, wherein (c) includes transforming the set of collected formation data into the renormalized dataset according to at least one member of the group consisting of:
 (1) at least one predetermined equation;
 (2) a predefined multi-dimensional look-up table; and
 (3) a predefined one-dimensional look-up table.

27. The method of claim 20, wherein (c) includes transforming the set of collected formation data into the renormalized dataset according to weighted sums, the weighted sums comprising:

$$g'_a = \sum_{i=1}^{N} c_{ia} f_{ia}(g_a)$$

$$g'_p = \sum_{i=1}^{N} c_{ip} f_{ip}(g_p)$$

where $g_a$ and $g_p$ represent collected formation data, $g'_a$ and $g'_p$ represent corresponding members of the renormalized dataset, i=1 to N terms in the weighted sums, $f_{ia}$ and $f_{ip}$ are functions representing preselected transformations between mandrel and point-dipole data over prescribed trajectories in the $g_a$, $g_p$ plane, and $c_{ia}$ and $c_{ip}$ are coefficients chosen to produce values for $g'_a$ and $g'_p$ that approximate point-dipole values over an anticipated range of $g_a$ and $g_p$.

28. The processor-readable medium of claim 26, wherein the one-dimensional look-up table comprises:
 a plurality of sets of table data, each set of table data matched to a corresponding one of a plurality of hypothetical earth formations, each set of table data further including a predicted measurement and a corresponding renormalized measurement that are each indicative of an electrical parameter of the corresponding hypothetical earth formation, wherein transformation from each predicted measurement to its corresponding renormalized measurement substantially reflects application of one of the simplifying assumptions to the predicted measurement.

29. The processor-readable medium of claim 26, wherein (c) in claim 20 further comprises deriving members of the renormalized dataset by interpolating members of the set of collected formation data between sets of table data in the one-dimensional look-up table.

30. The processor-readable medium of claim 26 wherein the one-dimensional look up table was previously generated by deriving each of the plurality of sets of table data for a single dielectric constant value and a series of corresponding resistivity values.

31. The processor-readable medium of claim 26, wherein the one-dimensional look up table was previously generated by deriving each of the plurality of sets of table data for a single resistivity value and a series of corresponding dielectric constant values.

32. The processor-readable medium of claim 26, wherein each of a predetermined subset of the plurality of hypothetical earth formations assumes a selected dielectric constant value and one of a plurality of different corresponding conductivity values.

33. A method of estimating electrical parameters of an earth formation using a measuring device disposed to be deployed in a borehole, the measuring device disposed to collect formation data via analysis of an electrical signal transmitted by the measuring device, the measuring device having a pre-established model associated therewith, the pre-established model governing the processing of the formation data to determine electrical parameters regarding the earth formation, the method comprising:
 (a) providing a simplified model associated with the measuring device, the simplified model making at least one simplifying assumption about the pre-established model;
 (b) receiving a set of collected formation data regarding the earth formation, the set of collected formation data collected by the measuring device;
 (c) normalizing the set of collected formation data to derive a renormalized dataset, wherein the renormalized dataset is substantially consistent with each of the simplifying assumptions in (a), said normalizing including transforming the set of collected formation data into the renormalized dataset according to a predefined one-dimensional look-up table comprising a plurality of sets of table data, each set of table data matched to a corresponding one of a plurality of hypothetical earth formations, each set of table data further including a predicted measurement and a corresponding renormalized measurement that are each indicative of an electrical parameter of the corresponding hypothetical earth formation, wherein transformation from each predicted measurement to its corresponding renormalized measurement substantially reflects application of one of the simplifying assumptions to the predicted measurement;
 (d) applying the renormalized dataset to the simplified model to estimate at least one electrical parameter of the earth formation; and
 (e) using the estimate of the at least one electrical parameter of the earth formation in a manner selected from the group consisting of detecting a hydrocarbon within the earth formation, guiding a drill bit within a productive zone of the earth formation, estimating poor pressure of the earth formation, evaluating geological features of the earth formation, and detecting vertical fractures within the earth formation.

34. The method of claim 33, in which the measurement device comprises a mandrel, and wherein at least one of the simplifying assumptions in (a) includes a simplified assumption with respect to the effect of the mandrel on the pre-established model.

35. The method of claim 33, in which the measurement device comprises a transmitter antenna of finite size, and wherein at least one of the simplifying assumptions in (a) includes an assumption regarding the size of an antenna in the simplified model.

36. The method of claim 35, wherein the assumption regarding the size of an antenna in the simplified model is that said antenna is infinitesimal.

37. The method of claim 33, wherein the renormalized dataset includes data that represent point-dipole values.

38. The method of claim 33, wherein (c) further comprises deriving members of the renormalized dataset by interpolating members of the set of collected formation data between sets of table data in the one-dimensional look-up table.

39. The method of claim 33 wherein the one-dimensional look up table was previously generated by deriving each of the plurality of sets of table data for a single dielectric constant value and a series of corresponding resistivity values.

40. The method of claim 33, wherein the one-dimensional look up table was previously generated by deriving each of the plurality of sets of table data for a single resistivity value and a series of corresponding dielectric constant values.

41. The method of claim 33, wherein each of a predetermined subset of the plurality of hypothetical earth formations assumes a selected dielectric constant value and one of a plurality of different corresponding conductivity values.

42. A method of estimating electrical parameters of an earth formation using a measuring device disposed to be deployed in a borehole, the measuring device disposed to collect formation data, the measuring device having a pre-established model associated therewith, the pre-established model governing the processing of the formation data to determine electrical parameters regarding the earth formation, the method comprising:
- (a) providing a simplified model associated with the measuring device, the simplified model making at least one simplifying assumption about the pre-established model;
- (b) receiving a set of collected formation data regarding the earth formation, the set of collected formation data collected by the measuring device;
- (c) normalizing the set of collected formation data to derive a renormalized dataset, wherein the renormalized dataset is substantially consistent with each of the simplifying assumptions in (a), said normalizing including transforming the set of collected formation data into the renormalized dataset according to weighted sums, the weighted sums comprising:

$$g'_a = \sum_{i=1}^{N} c_{ia} f_{ia}(g_a)$$

$$g'_p = \sum_{i=1}^{N} c_{ip} f_{ip}(g_p)$$

where $g_a$ and $g_p$ represent collected formation data, $g'_a$ and $g'_p$ represent corresponding members of the renormalized dataset, i=1 to N terms in the weighted sums, $f_{ia}$ and $f_{ip}$ are functions representing preselected transformations between mandrel and point-dipole data over prescribed trajectories in the $g_a$, $g_p$ plane, and $c_{ia}$ and $c_{ip}$ are coefficients chosen to produce values for $g'_a$ and $g'_p$ that approximate point-dipole values over an anticipated range of $g_a$ and $g_p$;
- (d) applying the renormalized dataset to the simplified model to estimate at least one electrical parameter of the earth formation; and
- (e) using the estimate of the at least one electrical parameter of the earth formation in a manner selected from the group consisting of detecting a hydrocarbon within the earth formation, guiding a drill bit within a productive zone of the earth formation, estimating poor pressure of the earth formation, evaluating geological features of the earth formation, and detecting vertical fractures within the earth formation.

43. The method of claim 42, in which the measurement device comprises a mandrel, and wherein at least one of the simplifying assumptions in (a) includes a simplified assumption with respect to the effect of the mandrel on the pre-established model.

44. The method of claim 42, in which the measurement device comprises a transmitter antenna of finite size, and wherein at least one of the simplifying assumptions in (a) includes an assumption regarding the size of an antenna in the simplified model.

45. The method of claim 44, wherein the assumption regarding the size of an antenna in the simplified model is that said antenna is infinitesimal.

* * * * *